US007027056B2

(12) United States Patent
Koselj et al.

(10) Patent No.: US 7,027,056 B2
(45) Date of Patent: Apr. 11, 2006

(54) GRAPHICS ENGINE, AND DISPLAY DRIVER IC AND DISPLAY MODULE INCORPORATING THE GRAPHICS ENGINE

(75) Inventors: Metod Koselj, Düsseldorf (DE); Mika Tuomi, Soormarkku (FI)

(73) Assignees: NEC Electronics (Europe) GmbH, Duesseldorf (DE); Bitboys, Oy, Noornarkku (FI)

( * ) Notice: Subject to any disclaimer, the term of this patent is extended or adjusted under 35 U.S.C. 154(b) by 146 days.

(21) Appl. No.: 10/141,797

(22) Filed: May 10, 2002

(65) Prior Publication Data

US 2003/0214506 A1 Nov. 20, 2003

(51) Int. Cl.
*G06F 15/76* (2006.01)

(52) U.S. Cl. .................. 345/519; 345/613

(58) Field of Classification Search ............ 345/204, 345/690, 30, 48, 50, 55, 84, 87, 419, 423, 345/611–614, 441–443, 503, 519, 522, 531, 345/520

See application file for complete search history.

(56) References Cited

U.S. PATENT DOCUMENTS

| 5,742,788 A * | 4/1998 | Priem et al. ............... 711/110 |
| 5,821,950 A | 10/1998 | Rentschler et al. |
| 5,991,443 A | 11/1999 | Gallery et al. |
| 6,115,047 A * | 9/2000 | Deering ..................... 345/422 |
| 6,128,025 A * | 10/2000 | Bright et al. .............. 345/504 |
| 6,141,022 A | 10/2000 | Anfossi et al. |
| 6,275,234 B1 * | 8/2001 | Iwaki ......................... 345/428 |
| 6,320,595 B1 | 11/2001 | Simons et al. |
| 6,473,086 B1 * | 10/2002 | Morein et al. .............. 345/505 |
| 6,603,480 B1 * | 8/2003 | Shah .......................... 345/501 |
| 6,633,297 B1 * | 10/2003 | McCormack et al. ....... 345/506 |
| 6,690,377 B1 * | 2/2004 | Tuomi ........................ 345/519 |
| 2001/0043226 A1 | 11/2001 | Visser et al. |
| 2003/0025648 A1 * | 2/2003 | Glen et al. .................. 345/2.3 |
| 2003/0043110 A1 * | 3/2003 | Chaves et al. ............. 345/156 |
| 2003/0107579 A1 * | 6/2003 | Willis et al. ................ 345/545 |
| 2003/0128197 A1 * | 7/2003 | Turner et al. .............. 345/204 |

FOREIGN PATENT DOCUMENTS

| JP | 10063254 | 8/1996 |
| JP | 10-063254 | 6/1998 |
| WO | WO 99/16222 | 5/1999 |

(Continued)

OTHER PUBLICATIONS

IBM TDB "Fast and Efficient Perimeter Drawing of Filled Polygons in a Graphics System", vol. 33, issue 8 pp 454-460 (1991).*

(Continued)

*Primary Examiner*—Kee M. Tung
(74) *Attorney, Agent, or Firm*—Stites & Harbison PLLC; Ross F. Hunt, Jr.

(57) ABSTRACT

A display driver integrated circuit is provided for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine. In another aspect the graphics engine is held within the display module, but not embedded in the display driver IC. The invention provides graphics acceleration that increases display performance, but does not significantly increase cost of manufacture. Power consumption in comparison to non-accelerated CPU graphics processing is lowered.

28 Claims, 17 Drawing Sheets

FOREIGN PATENT DOCUMENTS

WO          WO 99/26222          5/1999

OTHER PUBLICATIONS

Authors Unknown; "3dfx Avenger High Performance Graphics Engine"; 3dfx Interactive, Inc.; XP-002289779; Dec. 18, 1999; pp 57-58, pp 165-178.

Foley et al; "Computer Graphics: Principles and Practice"; XP-002289646; Jul., 1997; pp. 92-109; pp. 124-127; pp. 471-476; pp. 882-902.

Schilling et al; "A New Simple And Efficient Antialiasing With Subpixel Masks"; Computer Graphics, vol. 25, No. 4, Jul., 1991; pp. 133-141.

Authors Unknown; "Hitachi Releases SuperH Mobile Application Processor "SH-Mobile" for optimum processing of multimedia applications for next-generation mobile phone"; Apr., 2004; XP002289953; retrieved from internet; pp. URL: http://global.hitachi.com/News/cnews/E/2002/0415/index.html; pp. 1-5.

* cited by examiner

GRAPHICS ENGINE, AND DISPLAY DRIVER IC AND DISPLAY MODULE INCORPORATING THE GRAPHICS ENGINE

FIELD OF THE INVENTION

The present invention relates to a graphics engine, and a display driver IC and display module incorporating the graphics engine.

BACKGROUND OF THE INVENTION

The invention finds application notably in small-area displays found on portable or console electrical devices. Numerous such devices exist, such as PDAs, cordless, mobile and desk telephones, in-car information consoles, hand-held electronic games sets, multifunction watches etc.

In the prior art, there is typically a main CPU, which has the task of receiving display commands, processing them and sending the results to the display module in a pixel-data form describing the properties of each display pixel. The amount of data sent to the display module is proportional to the display resolution and the colour depth. For example, a small monochrome display of 96×96 pixels with a four level grey scale requires a fairly small amount of data to be transferred to the display module. Such a screen does not, however, meet user demand for increasingly attractive and informative displays.

With the demand for colour displays and for sophisticated graphics requiring higher screen resolution, the amount of data to be processed by the CPU and sent to the display module has become much greater. More complex graphics processing places a heavy strain on the CPU and slows the device, so that display reaction and refresh rate may become unacceptable. This is especially problematic for games applications. Another problem is the power drain caused by increased graphics processing, which can substantially shorten the intervals between recharging of battery-powered devices.

In the rather different technical area of personal computers and computer networks, the problem of displaying sophisticated graphics at an acceptable speed is often solved by a hardware graphics engine (also known as a graphics accelerator) on an extra card that is housed in the processor box or as an embedded unit on the motherboard. The graphics engine takes over at least some of the display command processing from the main CPU. Graphics engines are specially developed for graphics processing, so that they are faster and uses less power than the CPU for the same graphics tasks. The resultant video data is then sent from the processor box to a separate "dumb" display module.

Known graphics engines used in PCs are specially conceived for large-area displays and are thus highly complex systems requiring separate silicon dies for the high number of gates used. It is impractical to incorporate these engines into portable devices, which have small-area displays and in which size and weight are strictly limited, and which have limited power resources.

Moreover, PC graphics engines are designed to process the types of data used in large-area displays, such as multiple bitmaps of complex images. Data sent to mobile and small-area displays may today be in vector graphics form. Examples of vector graphics languages are MacroMediaFlash™ and SVG™. Vector graphics definitions are also used for many gaming Application Programming Interfaces (APIs), for example Microsoft DirectX and Silicon Graphics OpenGL.

In vector graphics images are defined as multiple complex polygons. This makes vector graphics suited to images that can be easily defined by mathematical functions, such as game screens, text and GPS navigation maps. For such images, vector graphics is considerably more efficient than an equivalent bitmap. That is, a vector graphics file defining the same detail (in terms of complex polygons) as a bitmap file (in terms of each individual display pixel) will contain fewer bytes. The bitmap file is the finished image data in pixel format, which can be copied directly to the display.

A complex polygon is a polygon that can self-intersect and have "holes" in it. Examples of complex polygons are letters and numerals such as "X" and "8" and kanji characters. Vector graphics is, of course, also suitable for definition of the simple polygons such as the triangles that make up the basic primitive for many computer games. The polygon is defined by straight or curved edges and fill commands. In theory there is no limit to the number of edges of each polygon. However, a vector graphics file containing, for instance, a photograph of a complex scene will contain several times more bytes than the equivalent bitmap.

Software graphics processing algorithms are also known, some suitable for use with the high-level/vector graphics languages employed with small-area displays. Some algorithms are available, for example, in "Computer Graphics: Principles and Practice" Foley, Van Damn, Feiner, Hughes 1996 Edition, ISBN 0-201-84840-6.

Known software graphics algorithms use internal dynamic data structures with linked lists and sort operations. All the vector graphics commands giving polygon edge data must be read into the software engine and stored before it starts rendering (generating an image for display from the high-level commands received). The commands for each polygon are stored in a master list of start and end points for each polygon edge. The polygon is drawn scanline by scanline. For each scanline of the display the software selects which polygon edges cross the scanline and then identifies where each selected edge crosses the scanline. Once the crossing points have been identified, the polygon can be filled between them. The size of the master list that can be processed is limited by the amount of memory available in the software. The known software algorithms thus suffer from the disadvantage that they require a large amount of memory to store all the commands for complex polygons before rendering. This may prejudice manufacturers against incorporating vector graphics processing in mobile devices.

It is desirable to overcome the disadvantages inherent in the prior art and lessen the CPU load and data traffic for display purposes in portable electrical devices.

SUMMARY OF THE INVENTION

The invention is defined in the independent claims, to which reference should now be made. Advantageous features are defined in the dependent claims.

According to one embodiment of the invention there is provided a display driver IC, for connection to a small-area display, the IC including a hardware-implemented graphics engine for receiving vector graphics commands and rendering image data for display pixels in dependence upon the received commands, and also including display driver circuitry for driving the connected display in accordance with the image data rendered by the graphics engine.

According to another embodiment of the invention there is provided a display module for incorporation in a portable electrical device and including:

a display;

a hardware-implemented graphics engine for receiving vector graphics commands and rendering image data for display pixels in dependence upon the received commands; and display driver circuitry connected to the graphics engine and to the display for driving the display in accordance with the image data rendered by the graphics engine.

Although the personal computer (PC) solution is widely used for applications having a "dumb" display module, a separate processor box and a fixed power supply, it could not be used to overcome the graphics processing difficulties for portable devices in which traffic between the CPU and display has a substantial effect on power consumption. This is because the data sent to the dumb display from the processor area is not affected by the introduction of a PC graphics engine. RGB signals are sent from the processor box to the display as before. Thus high data traffic to the display and the resultant power consumption are unchanged.

For the first time, the inventors have realised that a graphics engine need not be provided in the CPU part of a device, but may be held in the display module. They have been able to design a hardware graphics engine that is sufficiently simple that it can be embedded in a display driver IC for a small-area display or in a display module for a portable electrical device. Since the graphics engine is in the display module, high-level graphics commands travel between the CPU and the display part of the mobile device, rather than pixel data. Use of graphics engines as opposed to non-accelerated CPU processing reduces power consumption. Use of the graphics engine in the display module allows considerable savings in power in a device of almost identical size and weight.

Thus, embodiments of the invention allow a portable electrical device to be provided with a display that is capable of displaying images from vector graphics commands whilst maintaining fast display refresh and response times and long battery life.

Reference herein to small-area displays includes displays of a size intended for use in portable electrical devices and excludes, for example, displays used for PCS.

Reference herein to portable devices includes hand-held, worn, pocket and console devices etc that are sufficiently small and light to be carried by the user.

Preferably, the graphics engine includes control circuitry/logic to read in one vector graphics command at a time, convert the command to spatial image information and then discard the original command before the next command is similarly processed. For example the engine may read in one edge-drawing command for one polygon edge of an image to be displayed at a time, or one fill command to colour a polygon that has already been read into the engine.

In preferred embodiments, the graphics engine includes edge drawing logic/circuitry linked to an edge buffer (of finite resolution) to store spatial information for (the edges of) any polygon read into the engine. This logic and edge buffer arrangement not only makes it possible to discard the original data for each edge once it has been read into the buffer, in contrast to the previous software engine. It also has the advantage that it imposes no limit on the complexity of the polygon to be drawn, as may be the case with the prior art linked list storage of the high-level commands.

The edge buffer may be of higher resolution than the front buffer of the display memory. For example, the edge buffer may be arranged to store sub-pixels, a plurality of sub-pixels corresponding to a single display pixel. The sub-pixels preferably switch between the set and unset states to store the spatial information. The provision of sub-pixels (more than one for each corresponding pixel of the display) facilitates manipulation of the data and anti-aliasing in an expanded spatial form, before consolidation into the display size. The number of sub-pixels per corresponding display pixel determines the degree of anti-aliasing available. Use of unset and set states only mean that the edge buffer requires one bit of memory per sub-pixel.

Preferably, the edge buffer stores each polygon edge as boundary sub-pixels which are set and whose positions in the edge buffer relate to the edge position in the final image. More preferably, the edge drawing logic includes a clipper unit to prevent processing of any polygon edge or polygon edge portion that falls outside the display area.

The graphics engine may include filler circuitry/logic to fill in polygons whose edges have been stored in the edge buffer. This two-pass method has the advantage of simplicity in that the edge buffer format is re-used before the steps to give the color of the filled polygon. The resultant set sub-pixels need not be re-stored in the edge buffer but can be used directly in the next steps of the process.

The graphics engine preferably includes a back buffer to store part or all of an image before transfer to a front buffer of the display driver memory. Use of a back buffer avoids rendering directly to the front buffer and can prevent flicker in the display image.

The back buffer is preferably of the same resolution as the front buffer of the display memory. That is, each pixel in the back buffer is mapped to a corresponding pixel of the front buffer. The back buffer preferably has the same number of bits per pixel as the front buffer to represent the colour and depth (RGBA values) of the pixel.

There may be combination logic/circuitry provided to sequentially combine each filled polygon produced by the filler circuitry into the back buffer. In this way the image is built up polygon by polygon in the back buffer before transfer to the front buffer for display.

Advantageously, the colour of each pixel stored in the back buffer is determined in dependence on the colour of the pixel in the polygon being processed, the percentage of the pixel covered by the polygon and the colour already present in the corresponding pixel in the back buffer. This colour-blending step is suitable for anti-aliasing.

In one preferred implementation, the edge buffer stores sub-pixels in the form of a grid having a square number of sub-pixels for each display pixel. For example, a grid of 4×4 sub-pixels in the edge buffer may correspond to one display pixel. Each sub-pixel is set or unset depending on the edges to be drawn.

In an alternative embodiment, every other sub-pixel in the edge buffer is not utilised, so that half the square number of sub-pixels is provided per display pixel. In this embodiment, if the edge-drawing circuitry requires that a non-utilised sub-pixel be set, the neighbouring (utilised) sub-pixel is set in its place. This alternative embodiment has the advantage of requiring fewer bits in the edge buffer per display pixel, but lowers the quality of antialiasing somewhat.

The slope of each polygon edge may be calculated from the edge end points and then sub-pixels of the grid set along the line. Preferably, the following rules are used for setting sub-pixels:

one sub-pixel only per horizontal line of the sub-pixel grid is set for each polygon edge;

the sub-pixels are set from top to bottom (in the Y direction);

the last sub-pixel of the line is not set;

any sub-pixels set under the line are inverted.

In this implementation, the filler circuitry may include logic/code acting as a virtual pen (sub-pixel state-setting filler) traversing the sub-pixel grid, which pen is initially off and toggles between the off and on states each time it encounters a set sub-pixel. The resultant data is preferably fed to amalgamation circuitry combining the sub-pixels corresponding to each pixel.

The virtual pen preferably sets all sub-pixels inside the boundary sub-pixels, and includes boundary pixels for right-hand boundaries, and clears boundary pixels for left-hand boundaries or vice versa. This avoids overlapping sub-pixels for polygons that do not mathematically overlap.

Preferably, the virtual pen's traverse is limited so that it does not need to consider sub-pixels outside the polygon edge. For example, a bounding box enclosing the polygon may be provided.

The sub-pixels (from the filler circuitry) corresponding to a single display pixel are preferably amalgamated into a single pixel before combination to the back buffer. Amalgamation allows the back buffer to be of smaller size than the edge buffer, thus reducing memory requirement.

Combination circuitry may be provided for combination to the back buffer, the number of sub-pixels of each amalgamated pixel covered by the filled polygon determining a blending factor for combination of the amalgamated pixel into the back buffer.

The back buffer is copied to the front buffer of the display memory once the image on the part of the display for which it holds information has been entirely rendered. In fact, the back buffer may be of the same size as the front buffer and hold information for the whole display. Alternatively, the back buffer may be smaller than the front buffer and store the information for part of the display only, the image in the front buffer being built from the back buffer in a series of external passes.

In this latter alternative, the process is shortened if only commands relevant to the part of the image to be held in the back buffer are sent to the graphics engine in each external pass (to the CPU).

The graphics engine may be provided with various extra features to enhance its performance.

The graphics engine may further include a curve tessellator to divide any curved polygon edges into straight-line segments and store the resultant segments in the edge buffer.

The graphics engine may be adapted so that the back buffer holds one or more graphics (predetermined image elements) which are transferred to the front buffer at one or more locations determined by the high level language. The graphics may be still or moving images (sprites), or even text letters.

The graphics engine may be provided with a hairline mode, wherein hairlines are stored in the edge buffer by setting sub-pixels in a bitmap and storing the bitmap in multiple locations in the edge buffer to form a line. Such hairlines define lines of one pixel depth and are often used for drawing polygon silhouettes.

When implemented in hardware, the graphics engine may be less than 100K gates in size and preferably less than 50K.

Any display suitable for use with vector graphics can be enhanced with the graphics engine of the present invention. In preferred embodiments the display is an LCD or LED based display and the driver circuitry is source driver circuitry.

The display driver circuitry is preferably driver circuitry for one direction of the display only (that is for rows or for columns). It may also include control circuitry for control of the display. This is generally the case for the source driver of amorphous TFT LCD displays.

The display driver circuitry may also include driver control circuitry for connection to a separate display driver for the other direction. In amorphous TFT LCD displays, the source driver often controls the gate driver.

One graphics engine may be provided per driver IC. However, where the graphics engine is not provided on the driver IC it may service a plurality of ICs in the display module, such as a plurality of source ICs used to drive a slightly larger display. The graphics engine in this case may be provided its own separate IC, or it may be embedded in a master source driver that controls the remaining source drivers.

The display driver/module may further include display memory, decoder and display latch and timing, data interface logic, control logic and power management logic.

The invention is also applicable to larger electrical devices having a display unit such as PCs and laptops, when vector graphics processing is required (perhaps in addition to other graphics processing).

The invention also relates to an electrical device including:

a processing unit; and a display unit having a display wherein the processing unit sends high-level (vector) graphics commands to the display unit and a graphics engine as described herein is provided in the display unit to render image data for display pixels in accordance with the high-level commands.

The graphics engine need not be implemented in hardware, but may alternatively be a software graphics engine. In this case the necessary coded logic could be held in the CPU, along with sufficient code/memory for any of the preferred features detailed above, if they are required. Where circuitry is referred to above, the skilled person will readily appreciate that the same function is available in a code section of a software implementation.

According to a further embodiment of the invention there is provided a graphics engine for rendering vector graphics commands, including an edge drawing unit to read in one polygon edge at a time, draw the edge and then discard the original command before processing the next command.

The graphics engine may be a program, preferably held in a processing unit, or may be a record on a carrier or take the form of a signal.

If a software (or a hardware) graphics engine is held in CPU (or a processing unit), it does not benefit from the advantage of decreased traffic between the CPU and display module. However, the specific advantages of the logical construction of the graphics engine remain. In this aspect, one advantage is that it does not require memory to hold a polygon edge or fill command once it has been read into the engine. Considerable memory savings are achievable, making the graphics engine particularly suitable for use with portable electrical devices, but also useful for larger electrical devices, which are not necessarily portable.

BRIEF DESCRIPTION OF THE DRAWINGS

Preferred features of the present invention will now be described, purely by way of example, with reference to the accompanying drawings, in which.

DESCRIPTION OF THE PREFERRED EMBODIMENTS

Functional Overview

Figure 1:
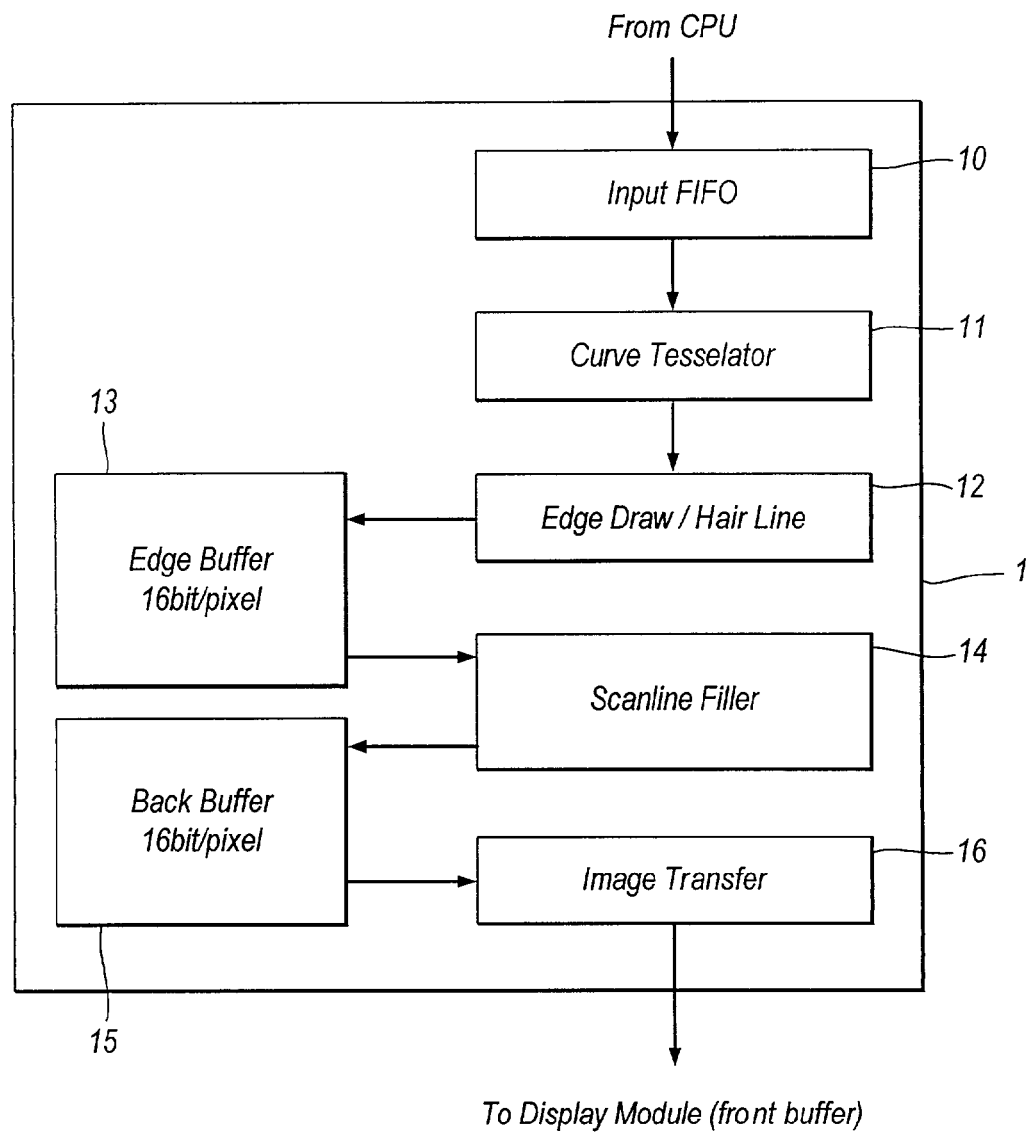
FIG. 1 is a block diagram representing function blocks of a preferred graphics engine.

The function boxes in FIG. 1 illustrate the major logic gate blocks of an exemplary graphics engine 1. The vector graphics command are fed through the input/output section 10 initially to a curve tessellator 11, which divides any curved edges into straight-line segments. The information passes through to an edge and hairline draw logic block 12 that stores results in an edge buffer 13, which, in this case has 16 bits per display pixel. The edge buffer information is fed to the scanline filler 14 section to fill-in polygons as required by the fill commands of the vector graphics language. The filled polygon information is transferred to the back buffer 15 (in this case, again 16 bits per display pixel), which, in its turn relays the image to an image transfer block 16 for transfer to the front buffer.

Figure 2:
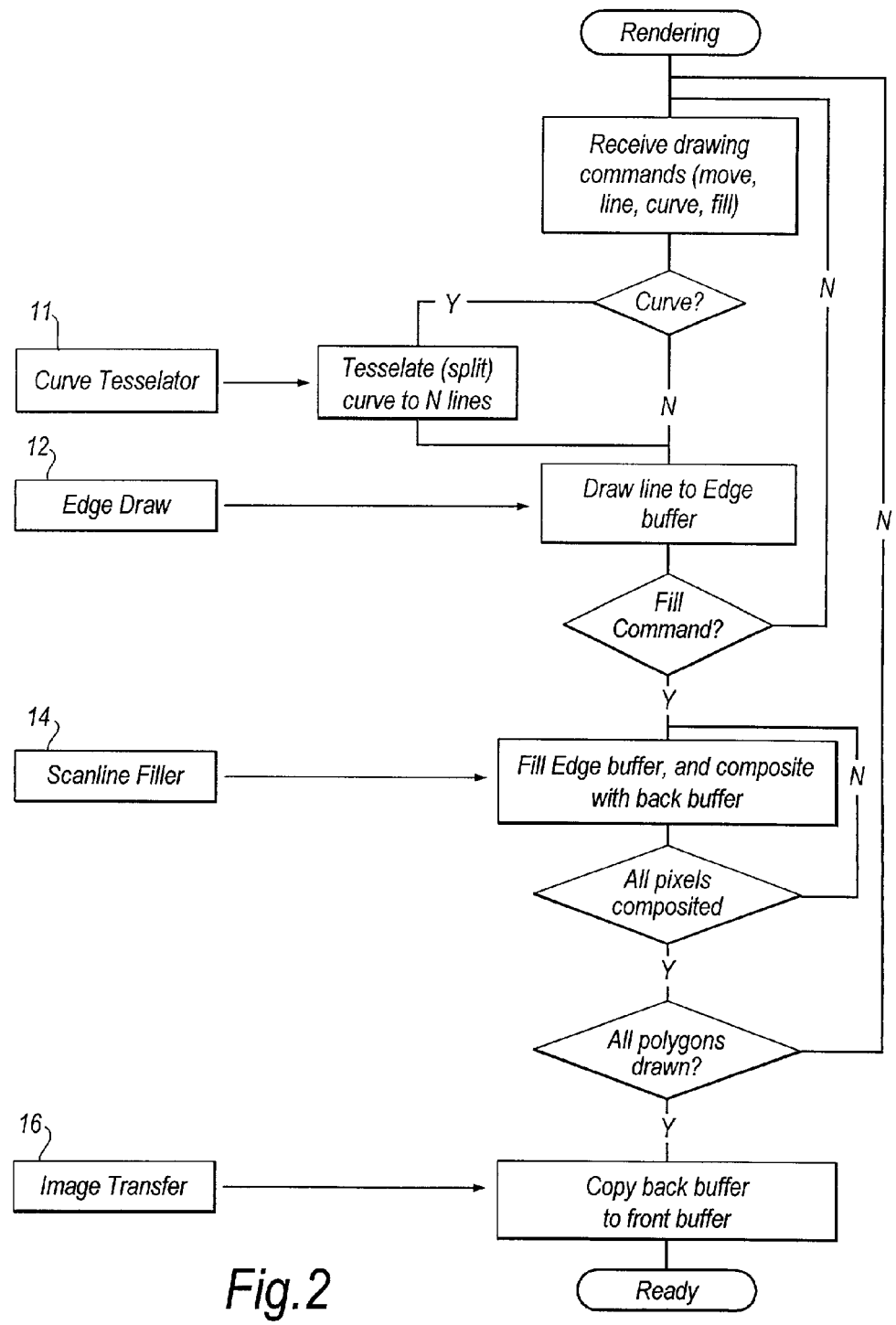
FIG. 2 is a flow chart illustrating operation of a preferred graphics engine.

The flow chart shown in FIG. 2 outlines the full rendering process for filled polygons. The polygon edge definition data comes into the engine one edge (in the form of one line or curve) at a time. The command language typically defines the image from back to front, so that polygons in the background of the image are defined (and thus read) before polygons in the foreground. If there is a curve it is tessellated before the edge is stored in the edge buffer. Once the edge has been stored, the command to draw the edge is discarded.

In vector graphics, all the edges of a polygon are defined by commands such as "move", "line" and "curve" commands before the polygon is filled, so that the tessellation and line drawing loop is repeated (in what is known as a first pass) until a fill command is read. The process then moves onto filling the polygon colour in the edge buffer format. This is known as the second pass. The next step is compositing the polygon colour with the colour already present in the same location in the back buffer. The filled polygon is added to the back buffer one pixel at a time. Only the relevant pixels of the back buffer (those covered by the polygon) are composited with the edge buffer.

Once one polygon is stored in the back buffer, the process then returns to read in the next polygon as described above. The next polygon, which is in front of the previous polygon, is composited into the back buffer in its turn. Once all the polygons have been drawn, the image is transferred from the back buffer to the front buffer, which may be, for example, in the source driver IC of an LCD display.

The Edge Buffer

Figure 3:
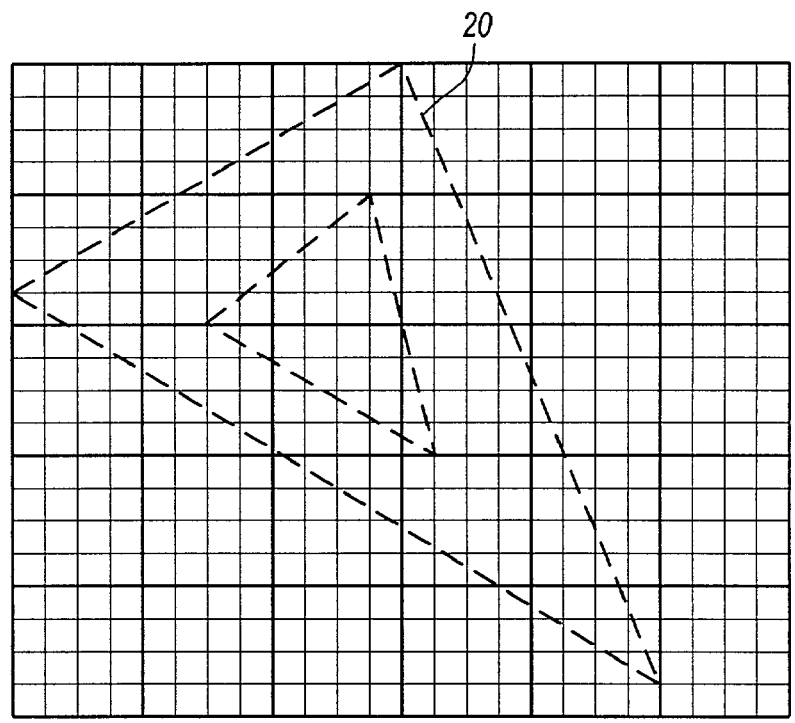
FIG. 3 is a schematic of an edge buffer showing the edges of a polygon to be drawn and the drawing commands that result in the polygon.

The edge buffer shown in FIG. 3 is of reduced size for explanatory purposes, and is for 30 pixels (6×5) of the display. It has a sub-pixel grid of 4×4 sub-pixels (16 bits) corresponding to each pixel of the display. Only one bit is required per sub-pixel, which takes the value unset (by default) or set.

The dotted line 20 represents the edges of the polygon to be drawn from the commands shown below.

Move To (12,0)
Line To (20, 19)
Line To (0, 7)
Line To (12,0)
Move To (11, 4)
Line To (13, 12)
Line To (6, 8)
Line To (11, 4)
Fill (black)

The command language refers to the sub-pixel co-ordinates, as is customary for accurate positioning of the corners. All of the commands except the fill command are processed as part of the first pass. The fill command initiates the second pass to fill and combine the polygon to the back buffer.

Figure 4:
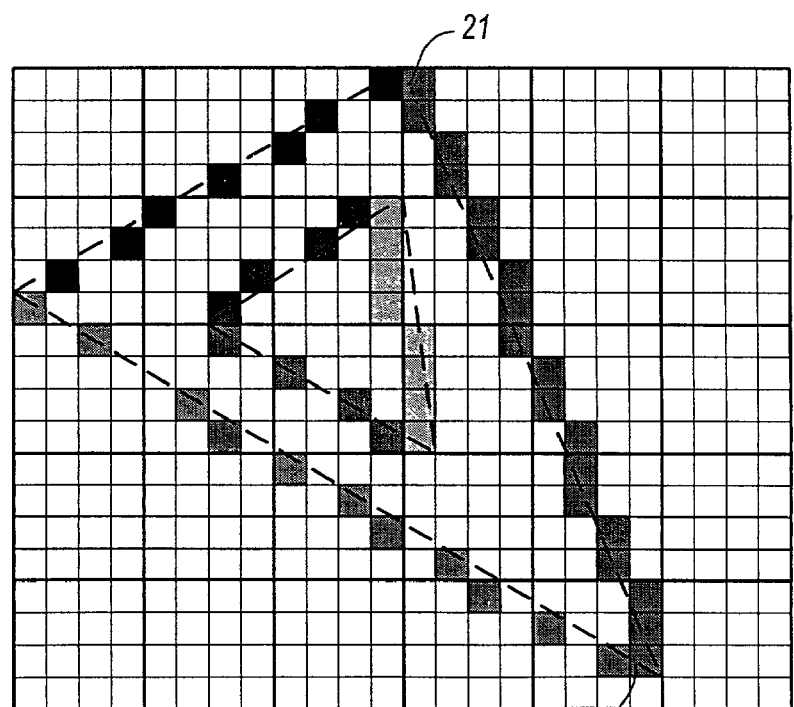
FIG. 4 is a schematic of an edge buffer showing sub-pixels set for each edge command.

FIG. 4 shows sub-pixels set for each line command. Set sub-pixels 21 are shown for illustration purposes only along the dotted line. Due to the reduced size, they cannot accurately represent sub-pixels that would be set using the commands or rules and code shown below.

The edges are drawn into the edge buffer in the order defined in the command language. For each line, the slope is calculated from the end points and then sub-pixels are set along the line. A sub-pixel is set per clock cycle.

The following rules are used for setting sub-pixels:

One sub-pixel only per horizontal line of the sub-pixel grid is set for each polygon edge.

The sub-pixels are set from top to bottom (in the Y direction).

Any sub-pixels set under the line are inverted.

The last sub-pixel of the line is not set.

The inversion rule is to handle self-intersection of complex polygons such as in the character "X". Without the inversion rule, the exact intersection point might have just one set sub-pixel, which would confuse the fill algorithm described later. Clearly, the necessity for the inversion rule makes it important to avoid overlapping end points of edges. Any such points would disappear, due to inversion.

To avoid such overlapping end points of consecutive lines on the same polygon the lowest sub-pixel is not set.

For example, with the command list:

Moveto(0,0)

Lineto(0,100)

Lineto(0,200)

The first edge is effectively drawn from 0,00 to 0,99 and the second line starts from 0,100 to 01,99. The result is a solid line. Since the line is drawn from top to bottom the last sub-pixel is also the lowest sub-pixel (unless the line is perfectly horizontal, as in this case).

The following code section implements an algorithm for setting boundary sub-pixels according to the above rules. The code before the "for (iy=y0+1; iy<y1; iy++)" loop is run once per edge and the code in the "for (iy=y0+1; iy<y1; iy++)" loop is run every clock cycle.

```
void edgedraw(int x0, int y0, int x1, int y1)
{
    float tmpx,tmpy;
    float step,dx,dy;
    int iy,ix;
    int bit,idx;
    // Remove non visible lines
    if ((y0==y1)) return;              //
Horizontal line
    if ((y0<0)&&(y1<0)) return;        // Out
top
    if ((x0>(176*4))&&(x1>(176*4))) return;   // Out
right
    if ((y0>(220*4))&&(y1>(220*4))) return;   // Out
bottom
    // Always draw from top to bottom (Y Sort)
    if (y1<y0)
    {
        tmpx=x0;x0=x1;x1=tmpx;
        tmpy=y0;y0=y1;y1=tmpy;
    }
    // Init line
    dx=x1-x0;
    dy=y1-y0;
    if (dy==0) dy=1;
    step=dx/dy;       // Calculate slope of the line
    ix=x0;
    iy=y0;
    // Bit order in sbuf (16 sub-pixels per pixel)
    // 0123
    // 4567
    // 89ab
    // cdef
    // Index= YYYYYYYXXXXXXXyyxx
    // four lsb of index used to index bits within
the unsigned short
    if (ix<0) ix=0;
    if (ix>(176*4)) ix=176*4;
    if (iy>0)
    {
        idx=((ix>>2)&511)|((iy>>2)<<9);    // Integer
part
        bit=(ix&3)|(iy&3)<<2;
        sbuf[idx&262143]^=(1<<bit);
    }
```

-continued

```
    for (iy=y0+1;iy<y1;iy++)
    {
        if (iy<0) continue;
        if (iy>220*4) continue;
        ix=x0+step*(iy-y0);
        if (ix<0) ix=0;
        if (ix>(176*4)) ix=176*4;
        idx=((ix>>2)&511)|((iy>>2)<<9);       // Integer
part
        bit=(ix&3)|(iy&3)<<2;
        sbuf[idx&262143]^=(1<<bit);
    }
}
```

Figures 5, 6:
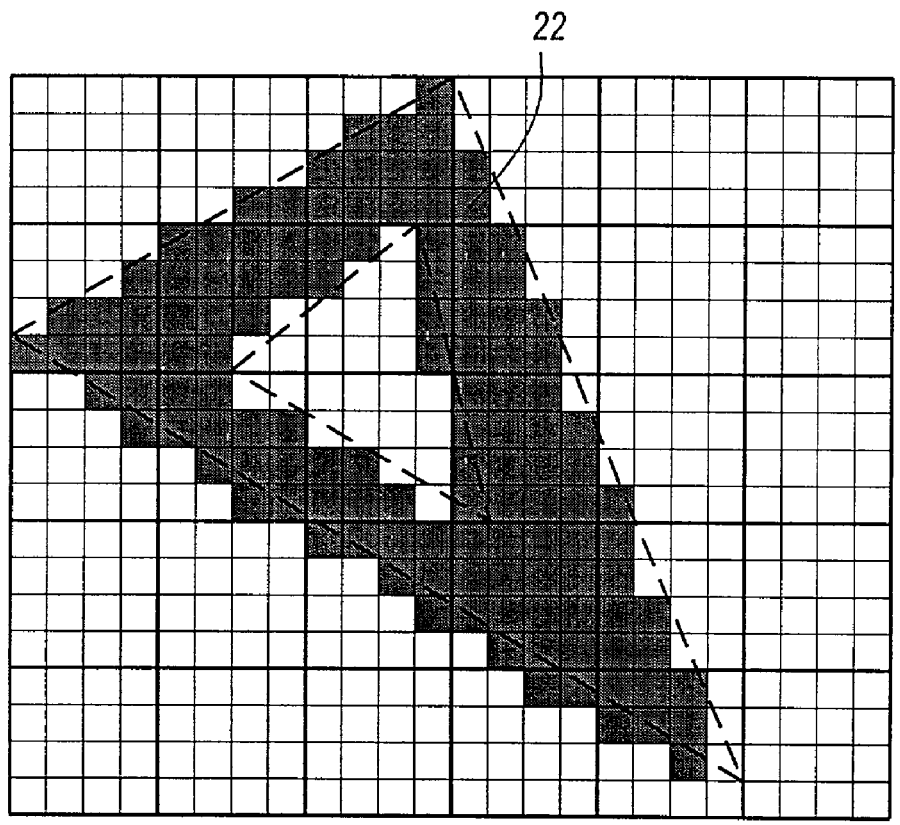
FIG. 5 is a schematic of an edge buffer showing a filled polygon.
FIG. 6 is a schematic of the amalgamated pixel view of the filled polygon shown in FIG. 5.

FIG. 5 shows the filled polygon in sub-pixel definition. The dark sub-pixels are set. It should be noted here that the filling process is carried out by filler circuitry and that there is no need to re-store the result in the edge buffer. The figure is merely a representation of the set sub-pixels sent to the next step in the process. The polygon is filled by a virtual marker or pen travelling across the sub-pixel grid, which pen is initially off and toggles between the off and on states each time it encounters a set sub-pixel. The pen moves from the left to the right in this example, one sub-pixel at a time. If the pen is up and the sub-pixel is set, then the pixel is left set and the pen sets the following pixels until it reaches another set pixel. The second set pixel is cleared and the pen remains up and continues to the right.

This method includes the boundary sub-pixels on the left of the polygon but leaves out sub-pixels on the right boundary. The reason for this is that if two adjacent polygons share the same edge, there must be consistency as to which polygon any given sub-pixel is assigned to, to avoid overlapped sub-pixels for polygons that do not mathematically overlap.

Once the polygon in the edge buffer has been filled, the sub-pixels belonging to each pixel can be amalgamated and combined into the back buffer. The coverage of each 4×4 mini-grid gives the depth of colour. For example, the third pixel from the left in the top row of pixels has 12/16 set pixels. Its coverage is 75%.

Combination Into the Back Buffer

FIG. 6 shows each pixel to be combined into the back buffer and its 4bit (0 . . . F hex) blending factor calculated from the sub-pixels set per pixel as shown in FIG. 5. One pixel is combined into the back buffer per clock cycle. A pixel is only combined if a value other than 0 is stored in the edge buffer.

The back buffer is not required to be the same size as the edge buffer and, can be smaller, for example corresponding to the display size or a part of the display.

The resolution of the polygon in the back buffer is one quarter of its size in the edge buffer in this example. The benefit of the two-pass method and amalgamation before storage of the polygon in the back buffer is that the total amount of memory required is significantly reduced. The edge buffer requires 1 bit per sub-pixel for the set and unset values. However, the back buffer requires 16 bits per pixel to represent the shade to be displayed and, if the back buffer were used to set boundary sub-pixels and fill the resultant polygons, the amount of memory required would be eight times greater than the combination of the edge and back buffers, that is, sixteen 16 bit buffers would be required, rather than two.

Edge Buffer Compression to 8 Bits

The edge buffer is described above as having a 16 bit value organized as 4×4 bits. An alternative arrangement reduces the memory required by 50% by lowering the edge buffer data per pixel to 8 bits.

This is accomplished by removing odd XY locations from the 4×4 layout for a single display pixel as shown below.

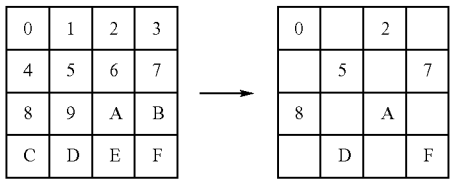

If a sub-pixel to be drawn to the edge buffer has coordinates that belong to a location without bit storage, it is moved one step to the right. For example, the top right sub-pixel in the partial grid shown above is shifted to the partial grid for the next display pixel to the right. The following code line is added to the code shown above.

if ((LSB(X) xor LSB(Y))==1) Y=Y+1; //LSB( ) returns the lowest bit of a coordinate This leaves only eight locations inside the 4×4 layout that can receive sub-pixels. These locations are packed to 8 bit data and stored to the edge buffer as before.

The 8 bit per pixel edge buffer is an alternative rather than a replacement to the 16 bit per pixel buffer. The antialiasing quality drops very little, so the benefit of 50% less memory may outweigh this disadvantage.

Rendering of Curves

Figure 7A:
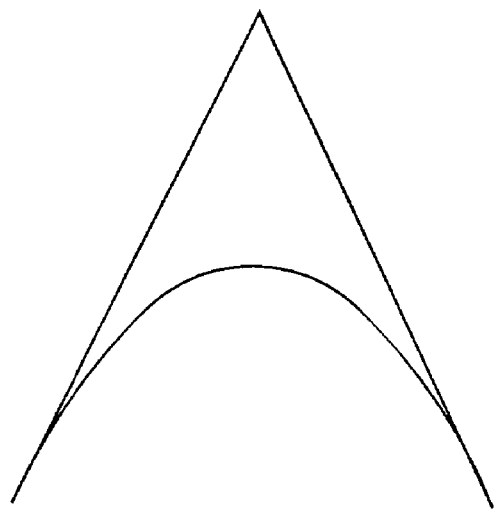
FIGS. 7a and 7b show a quadratic and a cubic bezier curve respectively.
Figure 7B:
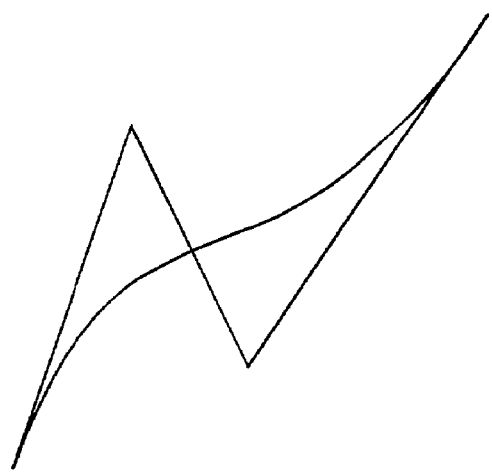

FIGS. 7a and 7b show a quadratic and a cubic bezier curve respectively. Both are always symmetrical for a symmetrical control point arrangement. Polygon drawing of such curves is effected by splitting the curve into short line segments (tessellation). The curve data is sent as vector graphics commands to the graphics engine. Tessellation in the graphics engine, rather than in the CPU reduces the amount of data sent to the display module per polygon. A quadratic bezier curve as shown in FIG. 7a has three control points. It can be defined as Moveto(x1, y1),CurveQto(x2, y2, x3, y3).

A cubic bezier curve always passes through the end points and is tangent to the line between the last two and first two control points. A cubic curve can be defined as Moveto(x1, y1),CurveCto(x2, y2, x3, y3, x4, y4).

The following code shows two functions. Each function is called N times during the tessellation process, where N is the number of line segments produces. Function Bezier3 is used for quadratic curves and Bezier4 for cubic curves. Input values p1–p4 are control points and mu is a value increasing from 0 to 1 during the tessellation process. Value 0 in mu returns p1, and value 1 in mu returns the last control point.

```
XY Bezier3(XY p1,XY p2,XY p3,double mu)
{
    double mum1,mum12,mu2;
    XY p;
    mu2 = mu * mu;
    mum1 = 1 - mu;
    mum12 = mum1 * mum1;
    p.x = p1.x * mum12 + 2 * p2.x * mum1 * mu + p3.x
```

```
    * mu2;
    p.y = p1.y * mum12 + 2 * p2.y * mum1 * mu + p3.y
    * mu2;
    return(p);
}
XY Bezier4(XY p1,XY p2,XY p3,XY p4,double mu)
{
    double mum1,mum13,mu3;
    XY p;
    mum1 = 1 - mu;
    mum13 = mum1 * mum1 * mum1;
    mu3 = mu * mu * mu;
    p.x = mum13*p1.x + 3*mu*mum1*mum1*p2.x +
3*mu*mu*mum1*p3.x + mu3*p4.x;
    p.y = mum13*p1.y + 3*mu*mum1*mum1*p2.y +
3*mu*mu*mum1*p3.y + mu3*p4.y;
    return(p);
}
```

The following code is an example of how to tessellate a quadratic bezier curve defined by three control points (sx, sy), (x0, y0) and (x1, y1). The tessellation counter x starts from one, because if it were zero the function would return the first control point, resulting in a line of zero length.

XY p1, p2, p3;
p1. x=sx;
p1. y=sy;
p2. x=x0;
p2. y=y0;
p3. x=x1;
p3. y=y1;

```
#define split 8
for(x=1;x<=split;x++)
{
    p=Bezier3(p1,p2,p3, x/split);    // Calculate
next point on curve path
    LineTo(p.x,p.y);                 // Send LineTo
command to Edge Draw unit
}
```

Figure 8:
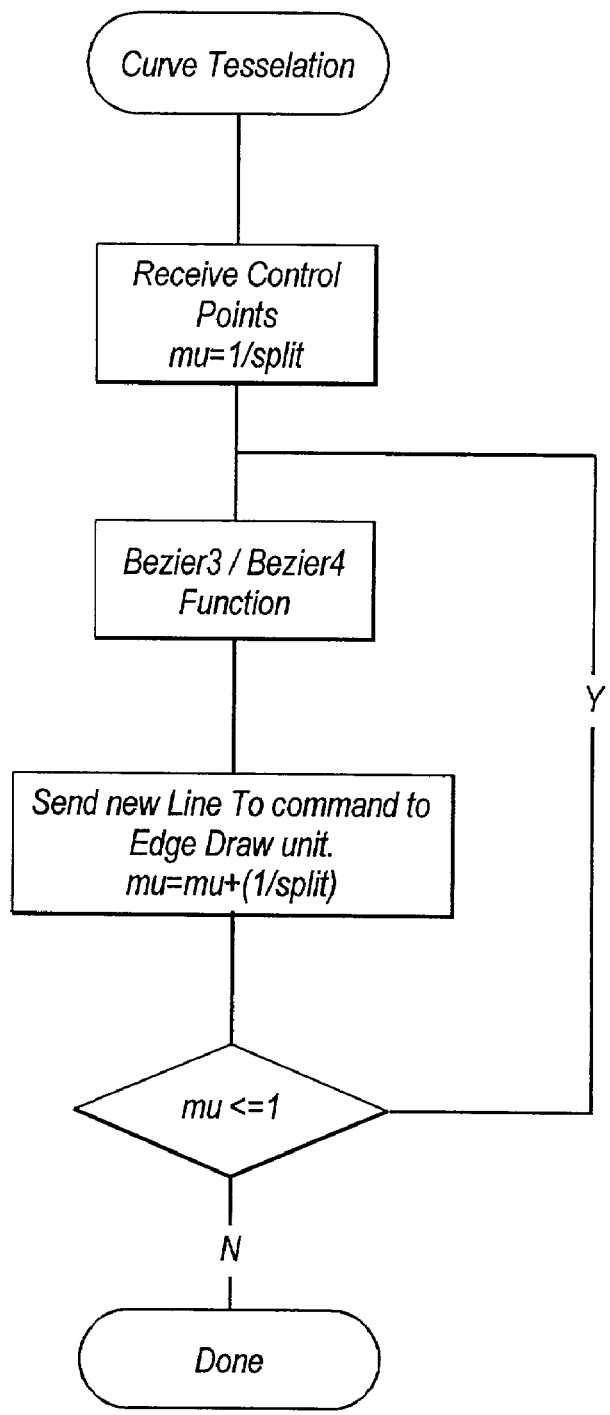
FIG. 8 shows a curve tessellation process according to an embodiment of the invention.

FIG. 8 shows the curve tessellation process defined in the above code sections and returns N line segments. The central loop repeats for each line segment.

Fill Types

The colour of the polygon defined in the high-level language may be solid; that is, one constant RGBA (red, green, blue, alpha) value for the whole polygon or may have a radial or linear gradient.

A gradient can have up to eight control points. Colours are interpolated between the control points to create the colour ramp. Each control point is defined by a ratio and an RGBA colour. The ratio determines the position of the control point in the gradient, the RGBA value determines its colour.

Whatever the fill type, the colour of each pixel is calculated during the blending process when the filled polygon is combined into the back buffer. The radial and linear gradient types merely require more complex processing to incorporate the position of each individual pixel along the colour ramp.

Figure 9:
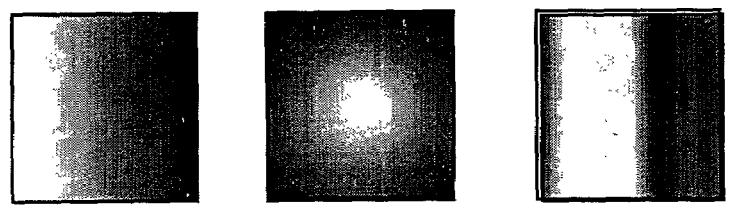
FIG. 9 gives four examples of linear and radial gradients.

FIG. 9 gives four examples of linear and radial gradients. All these can be freely used with the graphics engine of the invention.

Figure 10:
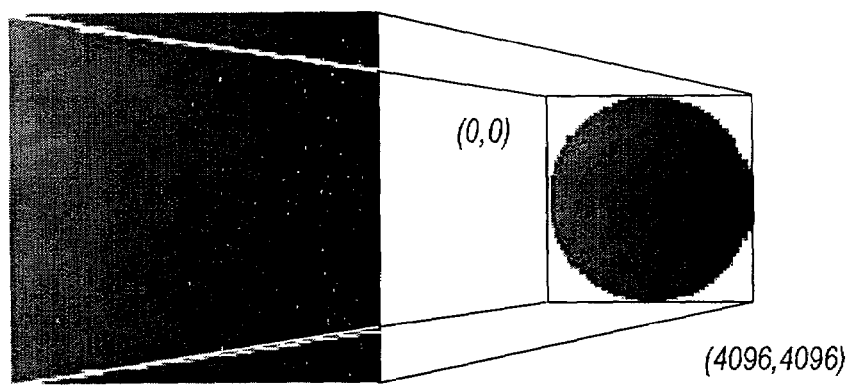
FIG. 10 shows a standard gradient square.

FIG. 10 shows a standard gradient square. All gradients are defined in a standard space called the gradient square.

The gradient square is centered at (0,0), and extends from (−16384,−16384) to (16384,16384).

In FIG. 10 a linear gradient is mapped onto a circle 4096 units in diameter, and centered at (2048,2048). The 2×3 Matrix required for this mapping is:

| | |
|---|---|
| 0.125 | 0.000 |
| 0.000 | 0.125 |
| 2048.000 | 2048.000 |

That is, the gradient is scaled to one-eight of its original size (32768/4096=8), and translated to (2048, 2048).

Figure 11:
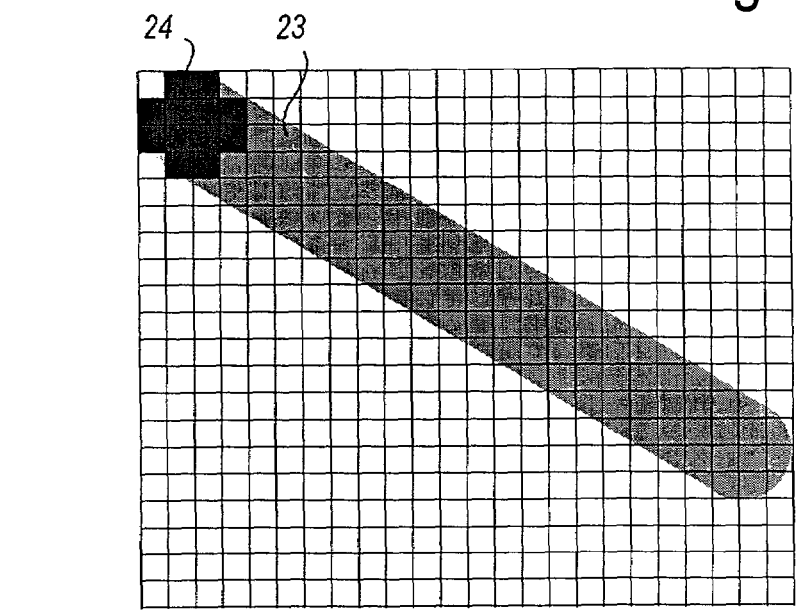
FIG. 11 shows a hairline to be drawn in the edge buffer.

FIG. 11 shows a hairline 23 to be drawn in the edge buffer. A hairline is a straight line that has a width of one pixel. The graphics engine supports rendering of hairlines in a special mode. When the hairline mode is on, the edge draw unit does not apply the four special rules described for normal edge drawing. Also, the content of the edge buffer is handled differently. The hairlines are drawn to the edge buffer while doing the fill operation on the fly. That is, there is no separate fill operation. So, once all the hair lines are drawn for the current drawing primitive (polygon silhouette for example), each pixel in the edge buffer contains filled sub-pixels ready for the scanline filler to calculate the set sub pixels for coverage information and do the normal colour operations for the pixel (blending to the back buffer). The line stepping algorithm used here is a standard and well known Bresenham line algorithm with the stepping on sub pixel level.

For each step a 4×4 pixel image 24 of a solid circle is drawn (with an OR operation) to the edge buffer. This is the darker shape shown in FIG. 11. As the offset of this 4×4 sub pixel shape does not always align exactly with the 4×4 sub pixels in the edge buffer, it may be necessary to use up to four read-modify-write cycles to the edge buffer where the data is bit shifted in X and Y direction to correct position.

The logic implementing the Bresenham algorithm is very simple, and may be provided as a separate block inside the edge draw unit. It will be idle in the normal polygon rendering operation.

Figure 12:
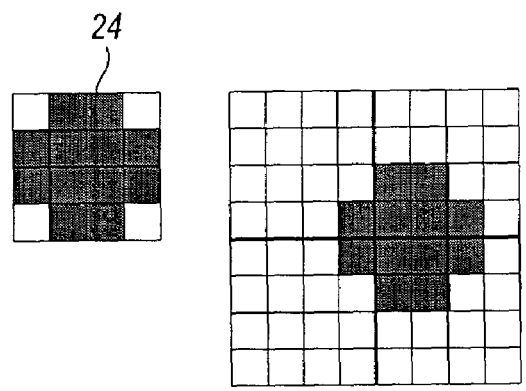
FIG. 12 shows the original circle shape to draw a hairline in the edge buffer, and its shifted position.

FIG. 12 shows the original circle shape, and its shifted position. The left-hand image shows the 4×4 sub pixel shape used to "paint" the line in to the edge buffer. On the right is an example of the shifted bitmap of three steps right and two steps down. Four memory accesses are necessary to draw the full shape in to the memory.

The same concept could be used to draw lines with width of more than one pixel but efficiency would drop dramatically as the overlapping areas of the shapes with earlier drawn shapes would be bigger.

Figure 13:
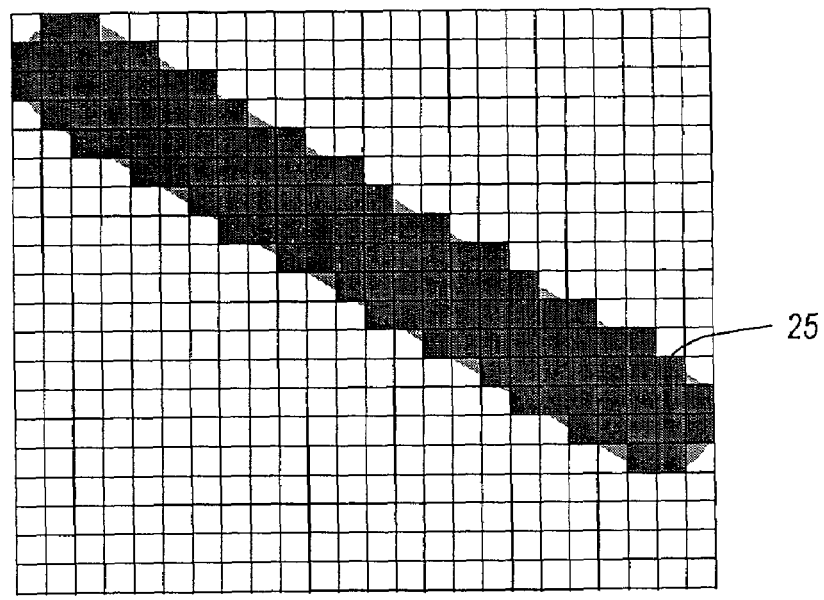
FIG. 13 shows the final content of the edge buffer when a hairline has been drawn.

FIG. 13 shows the final content of the edge buffer, with the sub-pixel hairline 25 which has been drawn and filled simultaneously as explained above. The next steps are amalgamation and combination into the back buffer.

The following is a generic example of the Bresenham line algorithm implemented in Pascal language. The code starting with the comment "{Draw the Pixels}" is run each clock cycle, and the remaining code once per line of sub-pixels.

```
procedure Line(x1, y1, x2, y2, : integer; color :
byte);
var i, deltax, deltay, numpixels,
    d, dinc1, dinc2,
    x, xinc1, xinc2,
    y, yinc1, yinc2 : integer;
```

-continued

```
begin
  { Calculate deltax and deltay for initialisation }
  deltax := abs(x2 − x1);
  deltay := abs(y2 − y1);
  { Initialize all vars based on which is the independent variable }
  if deltax >= deltay then
    begin
      { x is independent variable }
      numpixels := deltax + 1;
      d := (2 * deltay) − deltax;
      dinc1 := deltay Shl 1;
      dinc2 := (deltay − deltax) shl 1;
      xinc1 := 1;
      xinc2 := 1;
      yinc1 := 0;
      yinc2 := 1;
    end
  else
    begin
      { y is independent variable }
      numpixels := deltay + 1;
      d := (2 * deltax) − deltay;
      dinc1 := deltax Shl 1;
      dinc2 := (deltax − deltay) shl 1;
      xinc1 := 0;
      xinc2 := 1;
      yinc1 := 1;
      yinc2 := 1;
    end;
  { Make sure x and y move in the right directions }
  if x1 > x2 then
    begin
      xinc1 := − xinc1;
      xinc2 := − xinc2;
    end;
  if y1 > y2 then
    begin
      yinc1 := − yinc1;
      yinc2 := − yinc2;
    end;
  { Start drawing at }
  x := x1;
  y := y1;
  { Draw the pixels }
  for i := 1 to numpixels do
    begin
      PutPixel(x, y, color);
      if d < 0 then
        begin
          d := d + dinc1;
          x := x + xinc1;
          y := y + yinc1;
        end
      else
        begin
          d := d + dinc2;
          x := x + xinc2;
          y := y + yinc2;
        end;
    end;
end;
```

Back Buffer Size

The back buffer in which all the polygons are stored before transfer to the display module is ideally the same size as the front buffer (and has display module resolution, that is, one pixel of the back buffer at any time always corresponds to one pixel of the display). But in some configurations it is not possible to have a full size back buffer for size/cost reasons.

Figure 14:
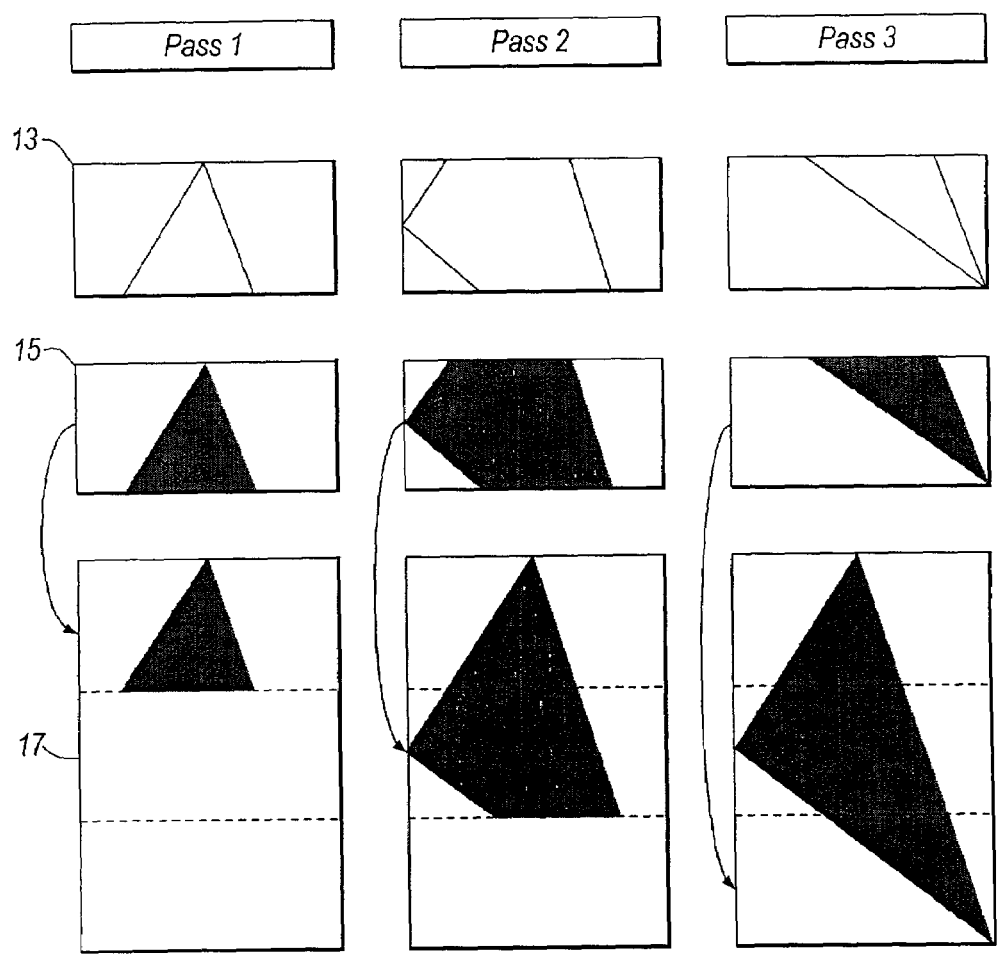
FIG. 14 shows a sequence demonstrating the contents of the edge, back and front buffers in which the back buffer holds ⅓ of the display image in each pass.

The size of the back buffer can be chosen prior to the hardware implementation. It is always the same size or smaller than the front buffer. If it is smaller, it normally corresponds to the entire display width, but a section of the display height, as shown in FIG. 14. In this case, the edge buffer 13 need not be of the same size as the front buffer. It is required, in any case, to have one sub-pixel grid per pixel of the back buffer.

If the back buffer 15 is smaller than the front buffer 17 as in FIG. 14, the rendering operation is done in multiple external passes. This means that the software running on host CPU must re-send at least some of the data to the graphics engine, increasing the total amount of data being transferred for the same resulting image.

The FIG. 14 example shows a back buffer 15 that is ⅓ of the front buffer 17 in the vertical direction. In the example, only one triangle is rendered. The triangle is rendered in three passes, filling the front buffer in three steps. It is important that everything in the part of the image in the back buffer is rendered completely before the back buffer is copied to the front buffer. So, regardless of the complexity of the final image (number of polygons), in this example configuration there would always be maximum of three image transfers from the back buffer to the front buffer.

The full database in the host application containing all the moveto, lineto, curveto commands does not have to be sent three times to the graphics engine. Only commands which are within the current region of the image, or commands that cross the top or bottom edge of the current region are needed. Thus, in the FIG. 14 example, there is no need to send the lineto command which defines bottom left edge of the triangle for the top region, because it does not touch the first (top) region. In the second region all three lineto commands must be sent as all lines touch the region. And in the third region, the line to on top left of the triangle does not have to be transferred.

Clearly, the end result would be correct without this selection of code to be sent but selection reduces the bandwidth requirement between the CPU and the graphics engine. For example, in an application that renders a lot of text on the screen, a quick check of the bounding box of each text string to be rendered will result in fast rejection of many rendering commands.

Sprites

Now that the concept of the smaller size back buffer and its transfer to the front buffer has been illustrated, it is easy to understand how a similar process can be used for rendering of 2D or 3D graphics or sprites. A sprite is a usually moving image, such as a character in a game or an icon. The sprite is a complete entity that is transferred to the front buffer at a defined location. Thus, where the back buffer is smaller than the front buffer, the back buffer content in each pass can be considered as one 2D sprite.

The content of the sprite can be either rendered with polygons, or by simply transferring a bitmap from the CPU. By having configurable width, height and XY offset to indicate which part of the back buffer is transferred to which XY location in the front buffer, 2D sprites can be transferred to the front buffer.

The FIG. 14 example is in fact rendering three sprites to the front buffer where the size of the sprite is full back buffer, and offset of the destination is moved from top to bottom to cover the full front buffer. Also the content of the sprite (back buffer) is rendered between the image transfers.

Figure 15:
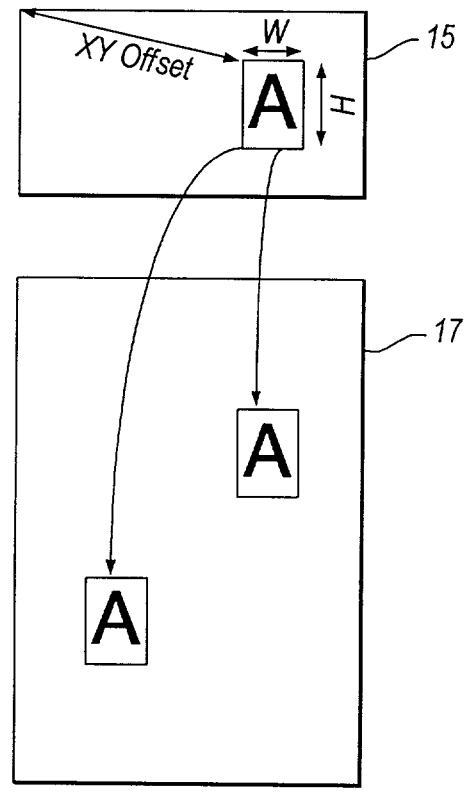
FIG. 15 shows one sprite in the back buffer copied to two locations in the front buffer.

FIG. 15 shows one sprite in the back buffer copied to two locations in the front buffer. Since the width, height and XY offset of the sprite can be configured, it is also possible to store multiple different sprites in the back buffer, and draw them to any location in front buffer in any order, and also multiple times without the need to upload the sprite bitmap from the host to the graphics engine. One practical example of such operation would be to store small bitmaps of each character of a font set in the back buffer. It would then be possible to draw bitmapped text/fonts in to the front buffer by issuing image transfer commands from CPU, where the XY offset of the source (back buffer) is defined for each letter.

Figure 16:
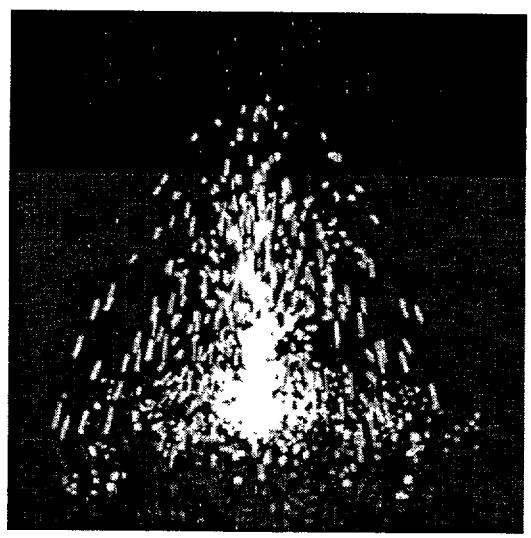
FIG. 16 shows an example in which hundreds of small 2D sprites are rendered to simulate spray of small particles.

FIG. 16 shows an example in which hundreds of small 2D sprites are rendered to simulate spray of small particles.

Hardware Implementation of the Graphics Engine

Figure 17:
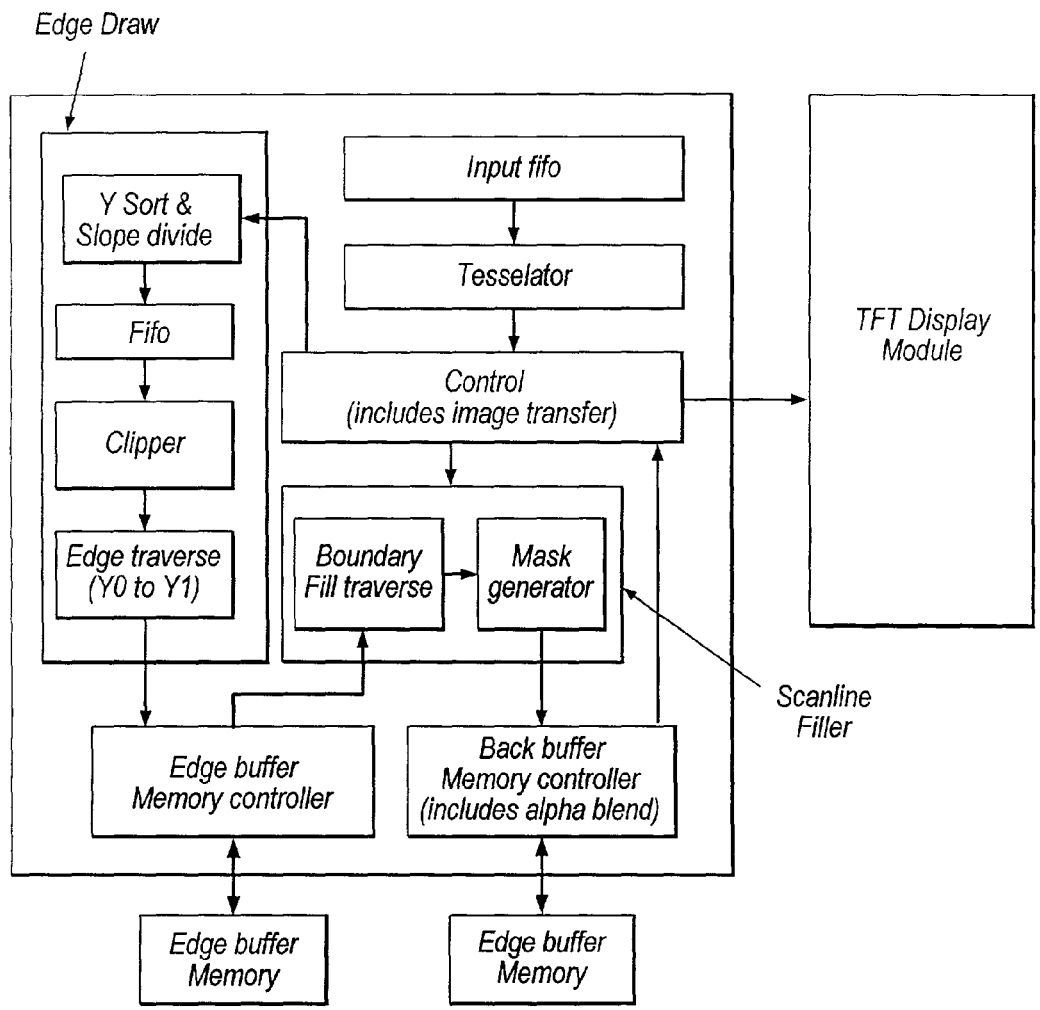
FIG. 17 shows a hardware implementation for the graphics engine.

A hardware implementation has been implemented as shown in FIG. 17. The figure shows more detailed block diagram of the internal units of the implementation.

The edge drawing circuitry is formed by the edge draw units shown in FIG. 17, together with the edge buffer memory controller.

The filler circuitry is shown as the scanline filler, with the virtual pen and amalgamation logic (for amalgamation of the sub-pixels into corresponding pixels) in the mask generator unit. The back buffer memory controller combines the amalgamated pixel into the back buffer.

A 'clipper' mechanism is used for removing non visible lines in this hardware implementation. Its purpose is to clip polygon edges so that their end points are always within the screen area while maintaining the slope and position of the line. This is basically a performance optimisation block and its function is implemented as the following four if clauses in the edgedraw function:

if (iy<0) continue;
if (iy>220*4) continue;
if (ix<0) ix=0;
if (ix>(176*4)) ix=176*4;

If both end points are outside the display screen area to the same side, the edge is not processed; otherwise, for any end points outside the screen area, the clipper calculates where the edge crosses onto the screen and processes the "visible" part of the edge from the crossing point only.

In hardware it makes more sense to clip the end points as described above rather than reject individual sub-pixels, because if the edge is very long and goes far outside of the screen, the hardware would spend many clock cycles not producing usable sub-pixels. These clock cycles are better spent in clipping.

The fill traverse unit reads data from the edge buffer and sends the incoming data to the mask generator. The fill traverse need not step across the entire sub-pixel grid. For example it may simply process all the pixels belonging to a rectangle (bounding box) enclosing the complete polygon. The guarantees that the mask generator receives all the sub-pixels of the polygon. In some cases this bounding box may be far from the optimal traverse pattern. Ideally the fill traverse unit should omit sub-pixels that are outside of the polygon. There are number of ways to add intelligence to the fill traverse unit to avoid such reading empty sub-pixels from the edge buffer. One example of such an optimisation is to store the left-most and right-most sub-pixel sent to the edge buffer for each scanline (or horizontal line of sub-pixels) and then traverse only between these left and right extremes.

The mask generator unit simply contains the "virtual pen" for the fill operation of incoming edge buffer sub-pixels and logic to calculate the resulting coverage. This data is then sent to back buffer memory controller for combinating to the back buffer (colour blending).

The following table shows approximate gate counts of various units inside the graphics engine and comments relating to the earlier description where appropriate.

| Unit Name | Gate count | Comment |
| --- | --- | --- |
| Input fifo | 3000 | Preferably implemented as RAM |
| Tesselator | 5000–8000 | Curve tesselator as described above |
| Control | 1400 | |
| Ysort & Slope divide | 6500 | As start of edge draw code section above |
| Fifo | 3300 | Makes Sort and Clipper work in parallel. |
| Clipper | 8000 | Removes edges that are outside the screen |
| Edge traverse | 1300 | Steps across the sub-pixel grid to set appropriate sub-pixels. |
| Fill traverse | 2200 | Bounding box traverse. More gates required when optimised to skip non covered areas. |
| Mask generator | 1100 | More gates required when linear and radial gradient logic added |
| Edge buffer memory controller | 2800 | Includes last data cache |
| Back buffer memory controller | 4200 | Includes alpha blending |
| TOTAL | ~40000 | |

Integration of the Graphics Engine into the Display Module

Figure 18:
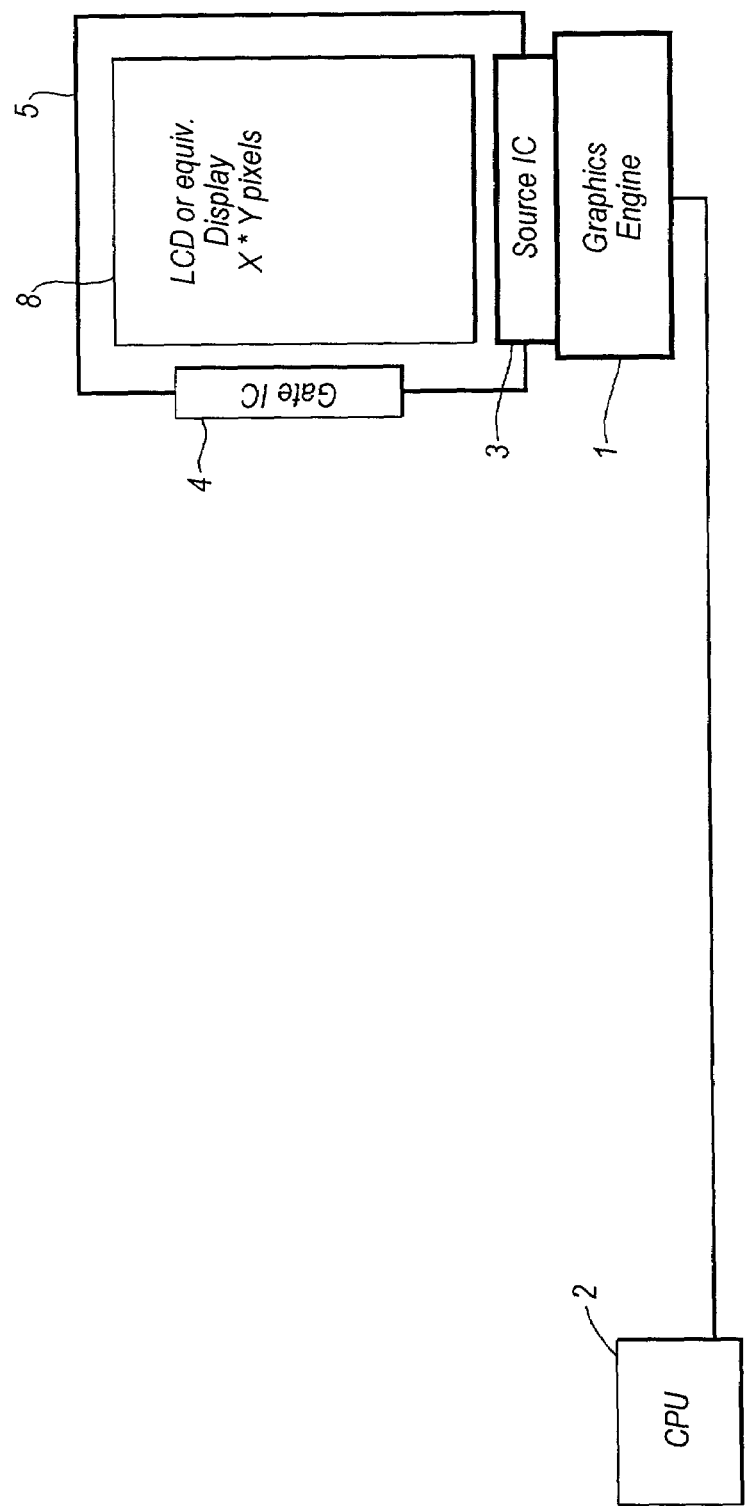
FIG. 18 is a schematic representation of a graphics engine according to an embodiment of the invention integrated in a source IC for an LCD or equivalent type display.

FIG. 18 is a schematic representation of a display module 5 including a graphics engine 1 according to an embodiment of the invention, integrated in a source IC 3 for an LCD or equivalent type display 8. The CPU 2 is shown distanced from the display module 5. There are particular advantages for the integration of the engine directly with the source driver IC. Notably, the interconnection is within the same silicon structure, making the connection much more power efficient than separate packaging. Furthermore, no special I/O buffers and control circuitry is required. Separate manufacture and testing is not required and there is minimal increase in weight and size.

The diagram shows a typical arrangement in which the source IC of the LCD display also acts as a control IC for the gate IC 4.

Figure 19:
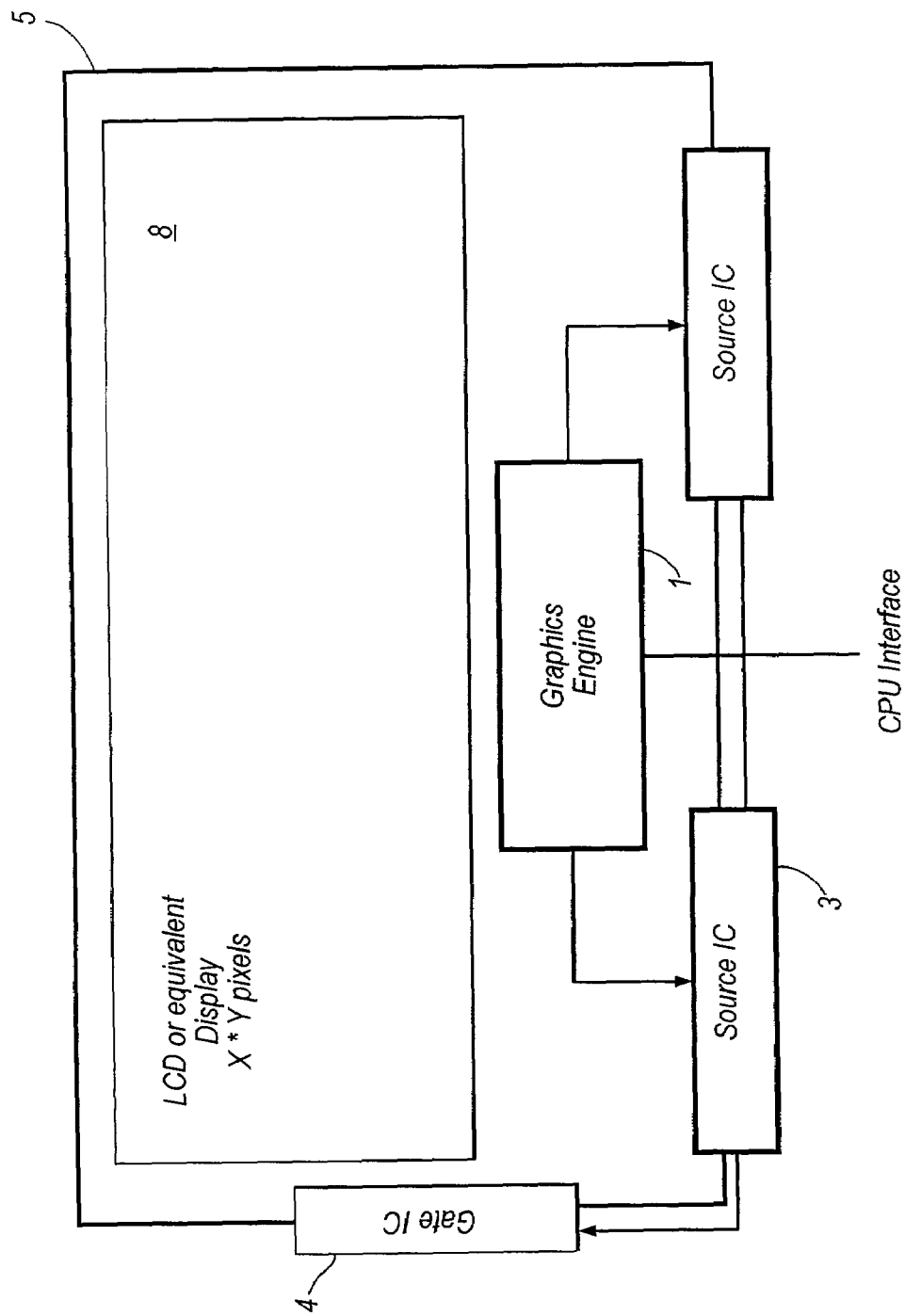
FIG. 19 is a schematic representation of a graphics engine according to an embodiment of the invention integrated in a display module and serving two source ICs for an LCD or equivalent type display.

FIG. 19 is a schematic representation of a display module 5 including a graphics engine 1 according to an embodiment of the invention, integrated in the display module and serving two source ICs 3 for an LCD or equivalent type display. The graphics engine can be provided on a graphics engine IC to be mounted on the reverse of the display module adjacent to the display control IC. If takes up minimal extra space within the device housing and is part of the display module package.

In this example, the source IC 3 again act as controller for a gate IC 4. The CPU commands are fed into the graphics engine and divided in the engine into signals for each source IC.

Figure 20:
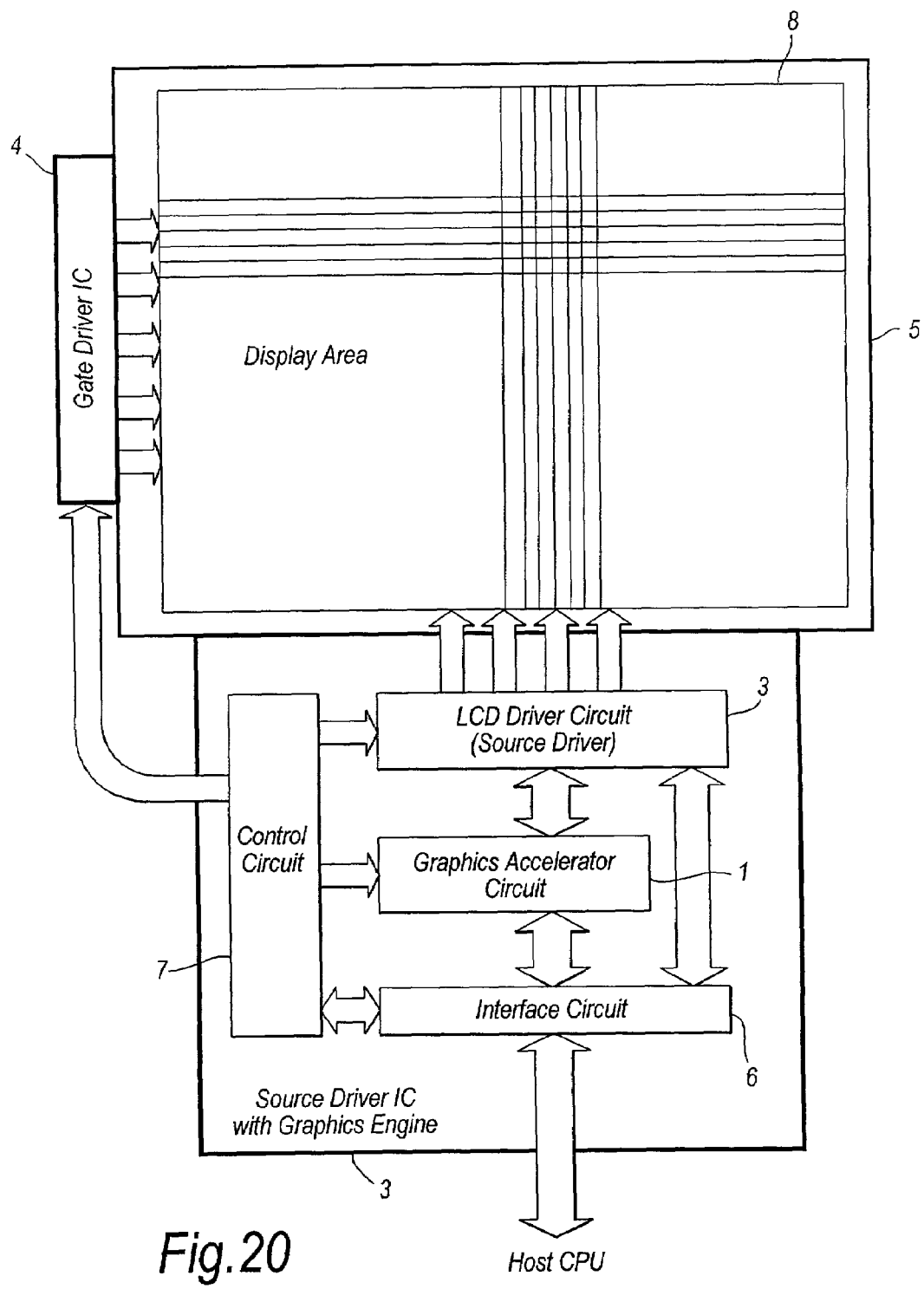
FIG. 20 is a schematic representation of a source driver IC incorporating a graphics engine and its links to CPU, the display area and a gate driver IC.

FIG. 20 is a schematic representation of a display module 5 with an embedded source driver IC incorporating a graphics engine and its links to CPU, the display area and a gate driver IC. The figure shows in more detail the communication between these parts. The source IC, which is both the driver and controller IC, has a control circuit for control of the gate driver, LCD driver circuit, interface circuit and graphics accelerator. A direct link between the interface circuit and source IC (bypassing the graphics engine) allows the display to work without the graphics engine.

Figure 21:
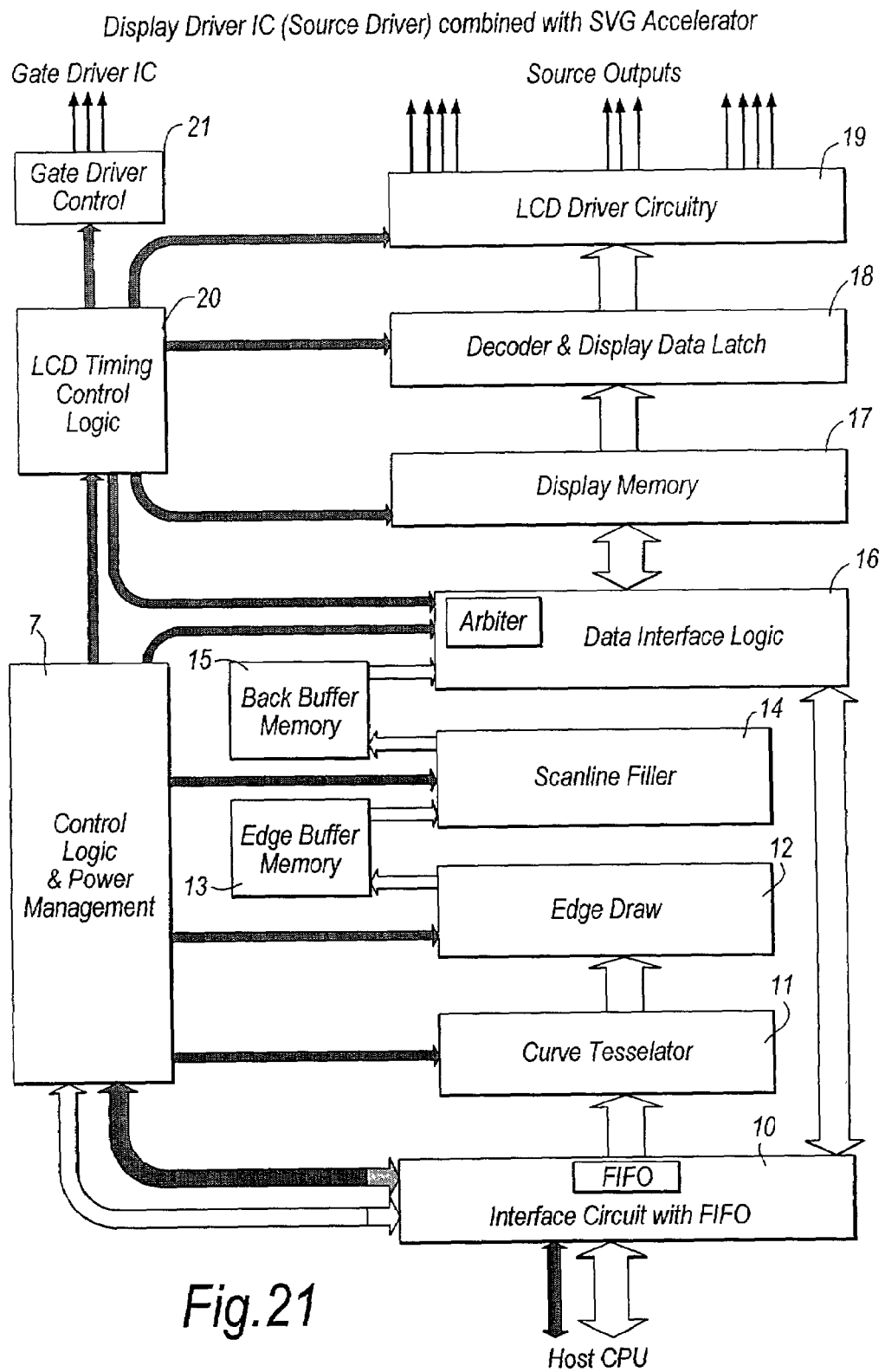
FIG. 21 shows the functional blocks of an IC driver with an incorporated graphics engine.

FIG. 21 shows component blocks in the display driver IC.

The power supply circuitry is not shown. It may be integrated, or as a separate device. The power supply circuit depends on the type of the display used.

Furthermore, the gate (Y/row direction) driver circuitry is not shown in any detail, because a similar situation applies as for the power circuitry, and the type of gate driver is not relevant to the invention.

It should be noted that the combination of display control IC (source driver) and graphics engine does not necessarily exclude any of the functionality of the existing display control IC.

Interface Circuit with FIFO

The type of the interface used may depend on end-customer demand (for example 8 bit parallel, 16 bit parallel, various control signals). The interface 10 has the ability to control data flow in both directions. Data flow is primarily from CPU, however, the possibility exists to read back data from the display memory (front buffer). Direct read/write may be used for low-level instructions or low level CPU interactions (BIOS level or similar).

The FIFO interface may be compatible/compliant with, for example, an Intel or Motorola standard peripheral interface bus or any custom type bus.

Control signals serve to perform handshaking for data transfer in either direction. For example, data transfer can be writing to a control register (control logic) to instruct the operation of the circuitry or reading a control/status register to verify the status of the circuitry or status of operation performing (finished or not finished).

Generally there are two modes of operation of the interface circuit related to data flow:

Basic mode, which writes to display memory directly (via data interface logic) bypassing graphics acceleration, or Accelerated mode, which sends high level commands to the graphics accelerator to interpret them.

The basic mode (writing directly into display memory) may be used in the following cases:

During power-on, a low level initialization routine (executed by host CPU) may purge or initialize display memory in order to display low level (BIOS type) messages or to display logo or other graphic.

Despite the presence of graphics acceleration the host CPU may directly access display memory to use the circuitry in legacy compatible mode (as in the prior art). This mode can be used for compatibility reasons if necessary.

Host CPU may read-out the contents of the display memory in case it requires the information in order to perform a transformation on the image currently displayed.

The basic mode use in the above cases is based on bitmap image data format. The second accelerated mode (b)) in which data in the form of high level commands, is sent to the graphics accelerator (via the command buffer/FIFO) is the mode which brings the key benefits described herein.

The curve tesselator 11, edge draw 12, edge buffer memory 13, scan-line filler 14 and back buffer blocks have previously been described in detail in relation to FIGS. 1 to 16.

Control Logic & Power Management

This central unit 7 controls overall operation of the circuitry. It is connected with the interface circuit and LCD timing control logic and controls all units of graphics acceleration, data exchange with host CPU and access to display memory.

A set of control/status registers is used to control the operation of the circuit. Host CPU writes values to control registers (via the interface circuit) to assign mode of operation and instruct circuitry what to do with consequent data coming from host CPU. Accordingly a set of status registers is used to represent current status and progress/completion of previously issued instructions.

This unit also generates control and timing signals for all blocks of the graphics accelerator, data interface logic and for LCD timing control logic block. These signals control all activities in the graphics accelerator part and steer data transfer between individual blocks up to data interface logic.

Further, this block controls the operation properties of the LCD timing control logic block, which controls all timing related to image refreshing on the display. Display refresh timing and the timing signals required for the operation of the graphics accelerator may be, but are normally not synchronized. Data interface logic has therefore arbitration logic to enable smooth transfer of data between the two clock domain areas.

Power Management Function

Generally two modes help to save power during operation and in stand-by mode: a) Dynamic clock gating during operations on data and b) Static mode during stand by mode.

Dynamic power management mode (a) controls all timing/clock signals to each individual block in a way to distribute/enable clock into only those blocks which are required to perform an operation on data. Clock signals for all other blocks are stopped (held high or low). This prevents unnecessary clocking of the circuitry in idle stage and thus saves power. The technique is called clock gating. Detection of activity is within the Control Logic and Power management unit and does not necessarily require CPU interaction.

Static power saving mode (b) is primarily used during stand-by time (most of the time for mobile devices) and thus extends stand-by time. This is implemented by locating all units/blocks of the circuitry, which are not used during stand-by time (for example all around the graphics accelerator circuit), in an isolated area with separate power supply pins. This area may still reside on the same silicon die, however, it is possible to switch it off by removing power supply for the isolated section. This is normally achieved using indirect host CPU interaction, as the CPU knows the state/mode of the mobile device.

Data Interface Logic

The data interface logic block 16 selects the data to be written into display memory or read out of it. One path (bypassing the graphics accelerator) feeds host CPU data into the display memory or the other way around, in case CPU needs to read some or all of the image back into CPU memory. The other path transfers calculated image data from the graphics accelerator into display memory.

This block is also used to perform arbitrage between circuitry of two different clock domains. The LCD driver portion performs transactions and operations under clock (or multiple of it) which enables appropriate display update/refresh rate (example 60 Hz). On the other side, graphics accelerator operation and interfacing with host CPU runs with a clock which allows sufficient acceleration performance and smooth interfacing with host CPU. Arbitrage enables smooth and (for the display) flicker-free transfer of image data to/from display memory, regardless of data origin (from CPU or from graphics accelerator).

Display Memory

This portion of memory 17 is also called the frame or front buffer. It holds image data for display. Either host CPU or data from the graphics accelerator updates the contents of this memory. LCD timing control logic allows the contents to be regularly refreshed and sent to the display. In case of any animated contents, new image data will be written into display memory, and during the next refresh period (LCD timing control logic) this image will appear on the display. In case of a static image or for case of stand-by operation (also static image) the contents of the display memory will not be changed. It will only be regularly read-out due to refreshing of the display.

This means that in stand-by mode or for a still image, all blocks before display memory may be switched to idle. Only the polling/monitoring functionality (in control logic & power management) has to run in order to trigger operation resume when host CPU sends a new command.

The memory size is normally X*Y*CD (X dimension of display in pixels, Y dimension, CD is colour depth/16 bit for 65 k colours).

Decoder & Display Latch

The decoder and display latch 18 converts bit image data stored in the display memory into column format. Each column for a pixel basically consists of three (sub) columns (RGB). Additionally, digital image information from the display memory is converted into analog signals.

As display driver signals (source outputs) are analogue signals with amplitude and levels different of those used in logic circuitry, level shifting is performed in this block.

Finally, data latch registers to hold the information for the time required to refresh one line (basically 1 pixel if we are talking in terms of 1 column). In the meantime, LCD timing & control logic, prepares the next set of data from the display memory to be latched and displayed (next line).

LCD Driver Circuitry

The LCD driver circuitry 19 prepares electrical signals to be applied to the display. This is an analogue type of circuitry and its actual construction heavily depends on the display type.

LCD Timing Control Logic

The LCD timing control logic unit 20 generates all timing and control signals for image refreshing on the display. It generates appropriate addressing and control signals to regularly update the display image with the content stored in the display memory. It initializes read out data from display memory (one line at a time), and passes it through the decoder & display data latch to be decoded and later passed through LCD driver circuitry. The clock timing and frequency of this block enables appropriate refresh rate of the display (e.g. 60 Hz). This block normally has its own oscillator and it is not synchronised with the rest of the circuitry around the Graphics Accelerator.

Gate Driver Control

The driver control block 21 represents the interface with the gate driver IC. It supplies signals to the gate driver IC to enable appropriate display refreshing. The exact details of this block depend on the type of display used.

The main function of this part is to sequentially scan all lines (rows) to generate the image in combination with information given by source driver. In the case of amorphous TFT type displays the voltage level to drive gate (row) stripes may be in the range of +/−15V. This requires the gate driver IC to be realized in a different process/technology. Not all display types require such a voltage range and where there is no such requirement an integrated version of the gate driver and source driver can be realized on one silicon die (IC).

The main part of the gate driver is a shift register which shifts/moves a pulse from the beginning to the end of the display (from the top stripe down to the bottom stripe) in sequence. Some additional functionality like pulse gating and shaping are also included in this part to obtain appropriate timing (to avoid overlaps, etc.). All the timing and pulse information comes from the display driver IC and is fully synchronized with it.

TFT Operation

Figure 22:
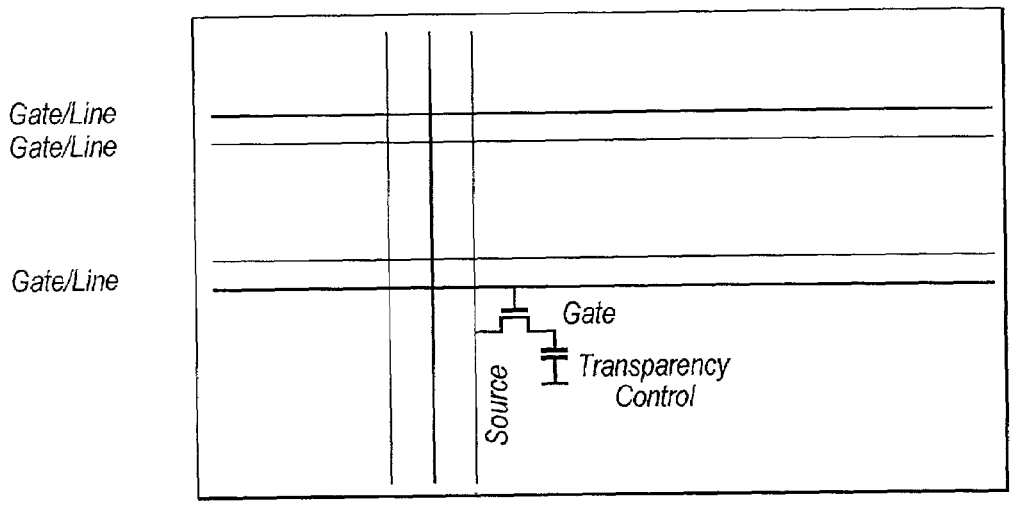
FIG. 22 shows TFT type structure and addressing as well as a typical timing diagram for the gate driver IC.
Figure 22:
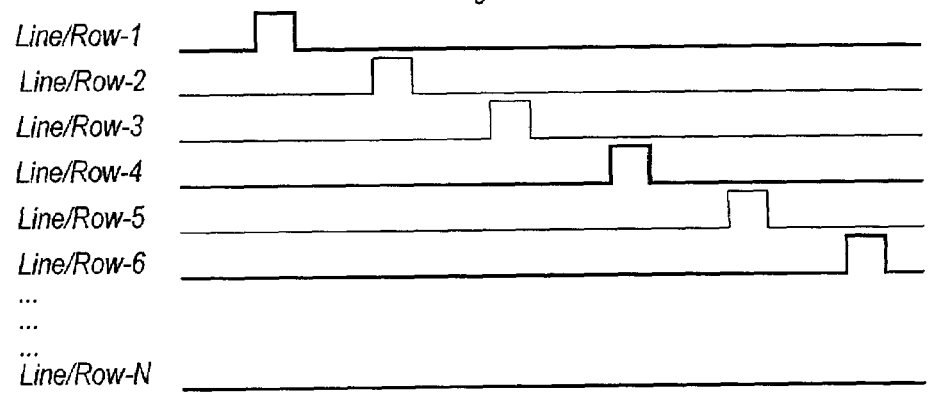

Displays suitable for use with the invention may have a TFT (thin film transistor) structure. A TFT display has a matrix (X-Y) addressable display field with X (gate/row) and Y (source/columns) conductive stripes. Voltage differences between the X and Y stripes control the degree of transmissibility of back-light. In colour displays there are 3 vertical (Y) stripes for each pixel to control RGB composition. FIG. 22 shows a TFT type structure and addressing as well as a typical timing diagram for the gate driver IC.

The display shown in FIG. 22 operates in a way to address one line(gate/row) at a time, proceeding to the next line and sequentially to the end (normally the bottom) of the display, and then resuming from the top. The speed of refreshing is called the refresh rate and may be in the range of 60 Hz (refreshes/second).

Source Driver Circuitry

Figure 23:
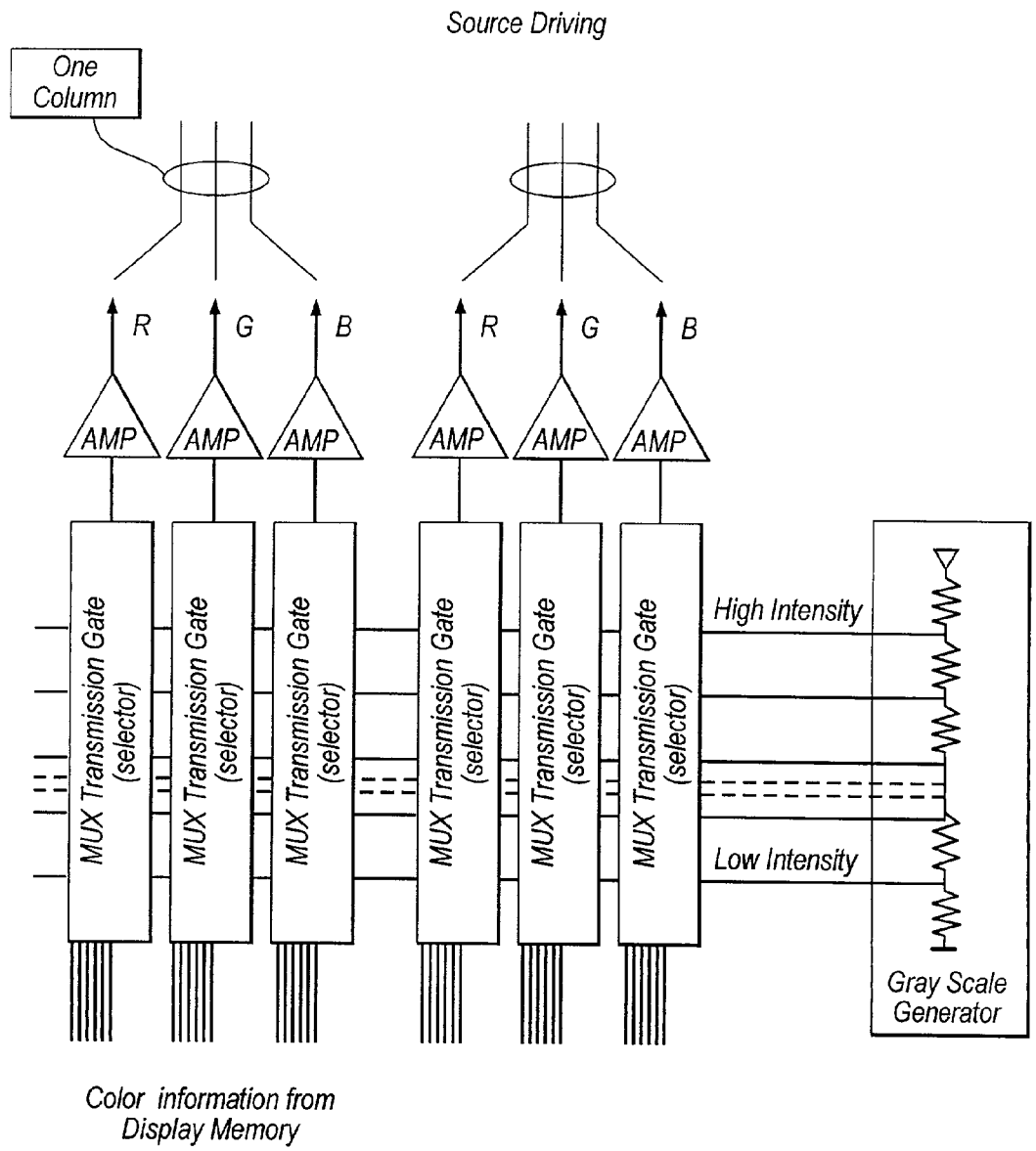
FIG. 23 shows source driving for an LCD display, in which colour information from the front buffer is sent to the display.

FIG. 23 shows source driving for a LCD display, in which color information from the front buffer is sent to the display. The pixel information for the entire row/line is read from display memory and applied to ADC converters, such as the decoder shown at 18 in FIG. 21. The MUD transmission gate selector in FIGS. 23 functions as an ADC. The number of ADC converters required is three times the display pixel resolution (RIB). In this case the ADC converter also functions as an analogue Multiplex/Selector. The digital value applied to ADC selects one of the levels generated by a gray scale generator. For example, selecting "low intensity" gives a dark image, and consequently "high intensity" gives a bright image. Color is composed on the display in similar manner as in a CRT tube. This procedure is repeated for each scan line.

The MUX transmission gate selector can also serve as a level shifter, since the voltages for the logic portion are normally lower than the voltage required to drive the Source line of the display. The voltage range for the Source Drive is in the range of 0V–5V. The Gray Scale Generator and MUX/Selector work with weak signals (determining intensity) and finally signals selected by the MUX/Selector are amplified (AMP) appropriately in order to drive the source stripe.

Although FIGS. 19 to 23 are specific to an LCD display, the invention is in no way limited to a single display type. Many suitable display types are known to the skilled person. These all have X-Y (column/row) addressing and differ from the specific LCD implementation shown above merely in driver implementation and terminology. Of course the invention is applicable to all LCD display types such as STN, amorphous TFT, LTPS (low temperature polysilicon) and LCOS displays. It is furthermore useful for LED base displays, such as OLED (organic LED) displays.

For example, one particular application of the invention would be in an accessory for mobile devices in the form of a remote display worn or held by the user. The display may be linked to the device by Bluetooth or a similar wireless protocol.

In many cases the mobile device itself is so small that it is not practicable (or desirable) to add a high resolution screen. In such situations, a separate near to eye (NTE) or other display, possibly on a user headset or user spectacles can be particularly advantageous.

The display could be of the LCoS type, which is suitable for wearable displays in NTE applications. NTE applications use a single LCoS display with a magnifier that is brought near to the eye to produce a magnified virtual image. A web-enabled wireless device with such a display would enable the user to view a web page as a large virtual image.

EXAMPLES

Display Variations where:
Display describes resolution of the display (X*Y)
Pixels is the amount of pixels on the display (=X*Y)
16 color bits is the actual amount of data to refresh/draw full screen (assuming 16 bits to describe properties of each pixel)
FrameRate@25 Mb/s describes number of times the display may be refreshed per second assuming the data transfer rate of 25 Mbit/second
Mb/s@15 fps represents required data transfer speed to assure 15 updates/second full screen.

| Display | Pixels | 16color bits | Frame Rate @25 Mb/s | Mb/s @15 fps |
| --- | --- | --- | --- | --- |
| 128 × 128 | 16384 | 262144 | 95.4 | 3.9 |
| 144 × 176 | 25344 | 405504 | 61.7 | 6.1 |
| 176 × 208 | 36608 | 585728 | 42.7 | 8.8 |
| 176 × 220 | 38720 | 619520 | 40.4 | 9.3 |
| 176 × 240 | 42240 | 675840 | 37.0 | 10.1 |
| 240 × 320 | 76800 | 1228800 | 20.3 | 18.4 |
| 320 × 480 | 153600 | 2457600 | 10.2 | 36.9 |
| 480 × 640 | 307200 | 4915200 | 5.1 | 73.7 |

Examples for Power Consumption for Different Interfaces.
CMADS i/f @ 25 Mb/s 0.5 mW→20 uW/Mb
CMOS i/f @25 Mb/s 1 mW→40 uW/Mb Hereafter 4 bus traffic examples demonstrating traffic reduction on CPU→Display bus:

(NOTE: these examples demonstrate only BUS traffic but not CPU load).

Case1: Full Screen of Kanji Text (Static

Representing a complex situation, for the display size 176×240 resulting in 42240 pixels, or 84480 Bytes (16 bit/pixel=2 Bytes/pixel). Assuming a minimum of 16×16 pixels for a kanji character, this gives 165 kanji characters per screen. One Kanji character may in average be described in about 223 Bytes, resulting in overall amount of 36855 Bytes of data.

| | | | |
| --- | --- | --- | --- |
| Byte | 84480 | | |
| Pix | 42240 | 16 | ←X * Y for one Kanji |
| Y-pix | 240 | 15 | |
| X-pix | 176 | 11 | |
| | | 165 | ←# kanji Full Screen |
| Display | | | |
| | | 223 | ←Bytes/Kanji (SVG) |
| Traffic BitMap | Traffic SVG | | |
| 84480 | 36855 | | |

In this particular case the use of SVG accelerator would require 36 Kbyte to be transferred and for Bitmap Refresh (=refresh or draw of full screen without using accelerator) results in 84 Kbyte data to be transferred. (56% reduction).

Due to SVG basic property (Scalable) 36 Kbytes of data remains unchanged, regardless of the screen resolution, assuming the same number of characters. This is not the case in bit-mapped system, where the traffic grows proportionally with # of pixels (X*Y).

Case2: Animated (@15 fps) Busy Screen (165 Kanji Characters) (Display 176×240)

```
                    84480        36855
    Fps     15     1267200      552825 bits
    UW      40       50.7         22.1 uW      for Bus
40 represents 40 µw/mbit of data.
```

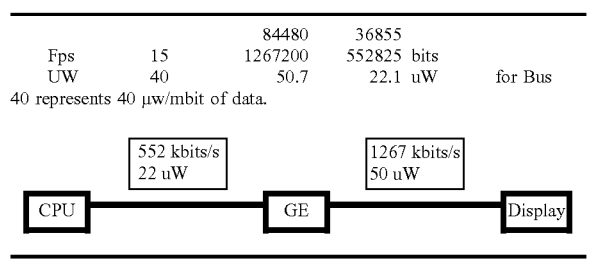

Case3: Filled Triangle over Full Screen

Full Screen
Bit—Map (=without accelerator) 84480 Byte data (screen 176×240, 16 bit colour),
for SVG accelerator only 16 Bytes (99.98% reduction).

Case4: Animated (@15 fps) Rotating Filled Triangle (Display 176×240)

```
                    84480         16
    Fps     15     1267200       240 bits
    UW      40       50.7        0.01 uW      for Bus
40 represents 40 µw/mbit of data.
```

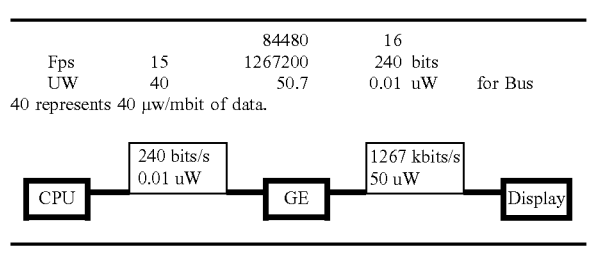

This last example shows the suitability of the graphics engine for use in games such as for animated Flash™ (Macromedia) based Games.

The invention claimed is:

1. A display driver integrated circuit, for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine, wherein the graphics engine includes control circuitry to read in one vector graphics command at a time, convert the command to spatial image information and then discard the original command.

2. A display driver integrated circuit, for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine, wherein the graphics engine includes edge-drawing circuitry linked to an edge buffer to store sequentially the edges of any polygon read into the engine.

3. A display driver circuit according to claim 2 wherein the edge buffer is arranged to store sub-pixels, a plurality of sub-pixels corresponding to each display pixel.

4. A display driver circuit according to claim 3 wherein each sub-pixel is switchable between set and unset states and wherein the edge buffer stores each polygon edge as boundary sub-pixels which are set and whose positions in the edge buffer correspond to the edge position in the final image.

5. A display driver circuit according to claim 2 wherein the graphics engine includes filler circuitry to fill in polygons whose edges have been stored in the edge buffer.

6. A display driver circuit according to claim 2 wherein the edge buffer comprises sub-pixels in the form of a grid having a square number of sub-pixels for each display pixel.

7. A display driver circuit according to claim 6 wherein every other sub-pixel in the edge buffer is not utilised, so that half the square number of sub-pixels is provided for each display pixel.

8. A display driver or circuit according to claim 7 wherein the following rules are used for setting sub-pixels:
one sub-pixel only per horizontal line of the sub-pixel grid is set for each polygon edge;
the sub-pixels are set from top to bottom (in the Y direction); the last sub-pixel of the line is not set;
any sub-pixels set under the line are inverted.

9. A display driver circuit according to claim 6 wherein a slope of each polygon edge is calculated from end points of the edge and then sub-pixels of the grid are set along the line.

10. A display driver circuit according to claim 6 wherein the graphics engine includes filler circuitry to fill in polygons whose edges have been stored in the edge buffer and filler circuitry includes logic acting as a virtual pen traversing the sub-pixel grid, which pen is initially off and toggles between the off and on states each time it encounters a set sub-pixel.

11. A display driver circuit according to claim 10 wherein the virtual pen sets all sub-pixels inside the boundary sub-pixels, and includes boundary pixels for right-hand boundaries, and clears boundary pixels for left-hand boundaries or vice versa.

12. A display driver circuit according to claim 6 wherein the number of sub-pixels of each amalgamated pixel covered by a filled polygon determines a blending factor for combination of the amalgamated pixel into a back buffer.

13. A display driver circuit according to claim 2 wherein the graphics engine further includes a curve tessellator to divide any curved polygon edges into straight-line segments and store the resultant segments in the edge buffer.

14. A display driver circuit according to claim 2 wherein the graphics engine is operable in hairline mode, in which mode hairlines are stored in the edge buffer by setting sub-pixels in a bitmap and storing the bitmap in multiple locations in the edge buffer to form a line.

15. A display driver integrated circuit, for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine, wherein the graphics engine includes a back buffer to store part or all of an image before transfer to a front buffer of a display memory, wherein the back buffer is smaller than the front buffer and stores the information for part of the display only, the image in the front buffer being built from the back buffer in a series of external passes, and wherein only commands relevant to the part of the image to be held in the back buffer are sent to the graphics engine in each external pass.

16. A display driver integrated circuit, for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine, wherein the display driver circuitry is for one direction of the display only.

17. A display driver integrated circuit, for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine wherein the display driver circuitry also includes display control circuitry for control of the display and wherein the display control circuitry also includes driver control circuitry for connection to a separate display driver for another direction.

18. A display driver integrated circuit, for connection to a small-area display, the integrated circuit including a hardware-implemented graphics engine for receiving vector graphics commands and rendering image data for display pixels in dependence upon the received commands, and also including display driver circuitry for driving the connected display in accordance with the image data rendered by the graphics engine, wherein the display driver further includes display memory, decoder and display latch and timing, data interface logic, control logic and power management circuitry.

19. A display driver circuit for incorporation in a portable electrical device and including:
 a display;
 a hardware-implemented graphics engine for receiving vector graphics commands and rendering image data for display pixels in dependence upon the received commands; and
 display driver circuitry connected to the graphics engine and to the display for driving the display in accordance with the image data rendered by the graphics engine, wherein the graphics engine includes edge-drawing circuitry linked to an edge buffer to store sequentially the edges of any polygon read into the engine,
 wherein the edge buffer is arranged to store sub-pixels, a plurality of sub-pixels corresponding to each display pixel,
 wherein each sub-pixel is switchable between set and unset states and
 wherein the edge buffer stores each polygon edge as boundary sub-pixels which are set and whose positions in the edge buffer correspond to the edge position in the final image.

20. A display driver circuit for incorporation in a portable electrical device and including:
 a display;
 a hardware-implemented graphics engine for receiving vector graphics commands and rendering image data for display pixels in dependence upon the received commands; and
 display driver circuitry connected to the graphics engine and to the display for driving the display in accordance with the image data rendered by the graphics engine wherein the graphics engine includes edge-drawing circuitry linked to an edge buffer to store sequentially the edges of any polygon read into the engine,
 wherein the edge buffer comprises sub-pixels in the form of a grid having a square number of sub-pixels for each display pixel, and
 wherein every other sub-pixel in the edge buffer is not utilised, so that half the square number of sub-pixels is provided for each display pixel.

21. A display driver or circuit according to claim 20 wherein the following rules are used for setting sub-pixels:
 one sub-pixel only per horizontal line of the sub-pixel grid is set for each polygon edge;
 the sub-pixels are set from top to bottom (in the Y direction);
 the last sub-pixel of the line is not set;
 any sub-pixels set under the line are inverted.

22. A display driver circuit for incorporation in a portable electrical device and including:
 a display;
 a hardware-implemented graphics engine for receiving vector graphics commands and rendering image data for display pixels in dependence upon the received commands; and
 display driver circuitry connected to the graphics engine and to the display for driving the display in accordance with the image data rendered by the graphics engine, wherein the graphics engine includes edge-drawing circuitry linked to an edge buffer to store sequentially the edges of any polygon read into the engine,
 wherein the edge buffer comprises sub-pixels in the form of a grid having a square number of sub-pixels for each display pixel, and
 wherein the graphics engine includes filler circuitry to fill in polygons whose edges have been stored in the edge buffer and filler circuitry includes logic acting as a virtual pen traversing the sub-pixel grid, which pen is initially off and toggles between the off and on states each time it encounters a set sub-pixel.

23. A display driver circuit according to claim 22 wherein the virtual pen sets all sub-pixels inside the boundary sub-pixels, and includes boundary pixels for right-hand boundaries, and clears boundary pixels for left-hand boundaries or vice versa.

24. A display module for incorporation in a portable electrical device and including:
 a display;
 a hardware-implemented graphics engine for receiving vector graphics commands and rendering image data for display pixels in dependence upon the received commands; and
 display driver circuitry connected to the graphics engine and to the display for driving the display in accordance with the image data rendered by the graphics engine wherein the graphics engine includes a back buffer to store part or all of an image before transfer to a front buffer of a display memory, wherein the back buffer is smaller than the front buffer and stores the information for part of the display only, the image in the display being built from the back buffer in a series of external passes, and wherein only commands relevant to the part of the image to be held in the back buffer are sent to the graphics engine in each external pass.

25. A display driver circuit for incorporation in a portable electrical device and including:
- a display;
- a hardware-implemented graphics engine for receiving vector graphics commands and rendering image data for display pixels in dependence upon the received commands; and
- display driver circuitry connected to the graphics engine and to the display for driving the display in accordance with the image data rendered by the graphics engine, wherein the graphics engine includes edge-drawing circuitry linked to an edge buffer to store sequentially the edges of any polygon read into the engine,
- wherein the graphics engine is operable in hairline mode, in which mode hairlines are stored in the edge buffer by setting sub-pixels in a bitmap and storing the bitmap in multiple locations in the edge buffer to form a line.

26. A display module for incorporation in a portable electrical device and including:
- a display;
- a hardware-implemented graphics engine for receiving vector graphics commands and rendering image data for display pixels in dependence upon the received commands; and
- display driver circuitry connected to the graphics engine and to the display for driving the display in accordance with the image data rendered by the graphics engine, wherein the display driver circuitry is for one direction of the display only.

27. A display module for incorporation in a portable electrical device and including:
- a display;
- a hardware-implemented graphics engine for receiving vector graphics commands and rendering image data for display pixels in dependence upon the received commands; and
- display driver circuitry connected to the graphics engine and to the display for driving the display in accordance with the image data rendered by the graphics engine, wherein the display driver circuitry also includes control circuitry for control of the display, wherein the display driver circuitry also includes control circuitry for control of the display, and wherein the display control circuitry also includes driver control circuitry for connection to a separate display driver for another direction.

28. A display module for incorporation in a portable electrical device and including:
- a display;
- a hardware-implemented graphics engine for receiving vector graphics commands and rendering image data for display pixels in dependence upon the received commands; and
- display driver circuitry connected to the graphics engine and to the display for driving the display in accordance with the image data rendered by the graphics engine, wherein the display driver further includes display memory, decoder and display latch and timing, data interface logic, control logic and power management circuitry.

* * * * *